United States Patent
McCaslin et al.

(10) Patent No.: US 8,817,423 B2
(45) Date of Patent: Aug. 26, 2014

(54) CIRCUIT INTEGRATED SUSPENSION AND METHOD OF MANUFACTURE THEREOF

(71) Applicant: Nitto Denko Corporation, Osaka (JP)

(72) Inventors: Martin John McCaslin, Pleasanton, CA (US); Alex Enriquez Cayaban, Fremont, CA (US)

(73) Assignee: Nitto Denko Corporation, Osaka (JP)

( * ) Notice: Subject to any disclaimer, the term of this patent is extended or adjusted under 35 U.S.C. 154(b) by 5 days.

(21) Appl. No.: 13/648,109

(22) Filed: Oct. 9, 2012

(65) Prior Publication Data

US 2013/0107397 A1 May 2, 2013

Related U.S. Application Data

(60) Provisional application No. 61/552,985, filed on Oct. 28, 2011, provisional application No. 61/620,302, filed on Apr. 4, 2012.

(51) Int. Cl.
*G11B 5/48* (2006.01)
*G11B 5/58* (2006.01)

(52) U.S. Cl.
USPC ............ 360/245.9; 360/234.5; 360/244.2; 360/244.3; 360/244.8; 360/245.8

(58) Field of Classification Search
USPC ............ 360/234.5, 245.8, 245.9, 26.3, 234.6, 360/244.2, 244.3, 244.8, 246, 266.3
See application file for complete search history.

(56) References Cited

U.S. PATENT DOCUMENTS

| | | | |
|---|---|---|---|
| 5,422,764 A * | 6/1995 | McIlvanie | 360/99.15 |
| 6,057,986 A | 5/2000 | Takasugi | |
| 6,201,667 B1 * | 3/2001 | Yamamoto et al. | 360/264.2 |
| 6,266,213 B1 * | 7/2001 | Hiraoka | 360/244.1 |
| 6,360,427 B1 * | 3/2002 | Takasugi | 29/603.06 |
| RE37,869 E * | 10/2002 | Suzuki | 360/99.18 |
| 6,563,676 B1 * | 5/2003 | Chew et al. | 360/264.7 |
| 6,636,383 B1 * | 10/2003 | Chew | 360/245.9 |
| 7,256,968 B1 | 8/2007 | Krinke | |
| 7,518,830 B1 | 4/2009 | Panchal et al. | |
| 8,194,356 B2 * | 6/2012 | Nagaoka et al. | 360/264.4 |
| 2010/0118443 A1 | 5/2010 | Ohsawa et al. | |

FOREIGN PATENT DOCUMENTS

| | | |
|---|---|---|
| JP | 06-243449 | 9/1994 |
| JP | 11-39629 | 2/1999 |
| JP | 2007-042262 | 2/2007 |
| JP | 2010-118096 | 5/2010 |

OTHER PUBLICATIONS

International Search Report issued on Jan. 8, 2013, in PCT/JP2012/078546.

\* cited by examiner

*Primary Examiner* — Jefferson Evans
(74) *Attorney, Agent, or Firm* — Sughrue Mion, PLLC

(57) ABSTRACT

An Extended Circuit Integrated Suspension (ECIS) design and manufacture thereof, to allow for circuit elements to be disposed onto the load beam on the opposite side of the flexure circuit. An Extended Circuit Integrated Suspension (ECIS) may include a load beam; a flexure circuit comprising a plurality of traces; and a connection portion which connects the load beam laterally to the flexure circuit. The load beam, the flexure circuit, and the connecting portion may be formed as a single component from a single panel, and the connection portion is oriented so that the connection portion is folded to place the flexure circuit onto a first side of the load beam. Applications for the use of the extended circuit are many, and a semi-collocated micro-actuator (SCLMA) is illustrated for example.

3 Claims, 24 Drawing Sheets

US 8,817,423 B2

CIRCUIT INTEGRATED SUSPENSION AND METHOD OF MANUFACTURE THEREOF

CROSS-REFERENCE TO RELATED APPLICATIONS

This application is a non-provisional application of and claims priority from U.S. Provisional Patent Application No. 61/552,985 filed Oct. 28, 2011, and U.S. Provisional Patent Application No. 61/620,302 filed Apr. 4, 2012, the specifications of which are incorporated herein in their entirety by reference for all purposes.

BACKGROUND

1. Field

The present application relates to extended circuit integrated suspensions (ECIS), and more specifically, to the load beam and the flexure circuit of the ECIS.

2. Description of the Related Art

Hard disk drives are continuously increasing capacity due to new features in all aspects of the electromechanical design. Several such features relate to the area in close proximity to, or inside, the read/write head and suspension supporting it. For example, the flying height control is employed by using a heating element around the read transducer. This results in additional traces to be brought to the head through the suspension flexure/circuit. While four lead heads were once common (two leads for the reader and two leads for the writer), the addition of the heater necessitated six lead heads and a corresponding capable suspension flexure/circuit. Thermal Asperity (TA) detection, which is a sensor located within the read/write head, is an example where eight lead heads and a corresponding capable suspension flexure/circuit are needed. Writer heaters, and Heat Assisted Magnetic Recording (HAMR), which co-locates a laser under the slider (head), further strain the interconnect challenges of the read/write head and suspension flexure/circuit. Further, data rate, bandwidth and low power consumption requirements tend to drive lower write trace impedance which is enabled by wider trace widths. Real estate management for the traces in the suspension flexure/circuit has become more important.

SUMMARY

Aspects of the present application may include an Extended Circuit Integrated Suspension (ECIS), which involves a load beam; a flexure circuit comprising a plurality of traces; and a connection portion which connects the load beam laterally to the flexure circuit, wherein the load beam, the flexure circuit, and the connecting portion are formed as a single component from a single panel, and the connection portion is oriented so that the connection portion is folded to place the flexure circuit onto a first side of the load beam.

Additional aspects of the present application may include an Extended Circuit Integrated Suspension (ECIS), which involves a load beam having a first plurality of traces disposed on a first side of the load beam and a first connection portion; and a flexure circuit which is disposed on an opposite side of the first side of the load beam and connected to the load beam by the first connection portion, and having a second plurality of traces and a second connection portion to connect to the first plurality of traces on the load beam.

Additional aspects of the present application may include a method of manufacturing an Extended Circuit Integrated Suspension (ECIS), which involves forming, in a single panel, a single component comprising a load beam, a flexure circuit, and a first connection portion which connects the load beam laterally to the flexure circuit; and folding over the single component, to place the flexure circuit onto the load beam.

Additional aspects of the present application may include an Extended Circuit Integrated Suspension (ECIS), which involves a load beam having a stainless steel layer, a polyimide layer disposed on a first side of the stainless steel layer, and circuitry disposed on the polyimide layer, the circuitry being connected to a via disposed on a portion of the polyimide layer located outside the stainless steel layer; and a flexure circuit which is disposed on an opposite side of the first side of the stainless steel layer, and having a plurality of traces and at least one connection portion to connect to said via.

Additional aspects of the present application may include an Extended Circuit Integrated Suspension (ECIS), which involves a load beam, comprising circuitry disposed on a first side of the load beam and connected to a via located on the load beam; and a flexure circuit which is disposed on an opposite side of said first side of the load beam, and having a plurality of traces and at least one connection portion to connect to the via, wherein at least one of said plurality of traces, which connects the connection portion to the flexure circuit, is folded over to connect the connection portion to the via on the first side of the load beam.

Additional aspects of the present application may include an Extended Circuit Integrated Suspension (ECIS), which involves a load beam, having circuitry disposed on a first side of the load beam and connected to a via located on the load beam; and a flexure circuit which is disposed on an opposite side of said first side of the load beam, and having a plurality of traces and at least one connection portion to connect to the via, and at least one piezoelectric device (PZT) disposed on the load beam and connected to the circuitry.

BRIEF DESCRIPTION OF THE DRAWINGS

The accompanying drawings, which are incorporated in and constitute a part of this specification exemplify the implementations and applications described herein and, together with the description, serve to explain and illustrate principles of the inventive technique.

FIGS. 17-19 illustrates an extended circuit integrated suspension (ECIS) for connection to PZT's acting as Semi Collocated Micro-Actuators (SCLMA), in accordance with an application of the example implementations.

DETAILED DESCRIPTION

In the following detailed description, reference is made to the accompanying drawings, in which identical functional elements are designated with like numerals. The accompanying drawings show by way of an illustration, and not by way of a limitation, certain exemplary embodiments and implementations consistent with aspects of exemplary embodiments. These implementations are described in sufficient detail to enable those skilled in the art to practice the exemplary embodiments and it is to be understood that other implementations may be utilized and that structural changes and/or substitutions of various elements may be made without departing from the scope and spirit of the inventive concept. The following detailed description is, therefore, not to be construed in a limited sense.

In the related art, placing instrumentation onto the load-beam was not possible, due to the lack of electrical connection means. Therefore, exemplary embodiments provide extended electrical connections to permit the placing of circuitry outside onto the load beam to interact with the flexure circuit on the opposite side.

FIGS. 1(*a*) to 1(*f*) illustrate a related art CIS and example implementations of an extended circuit integrated suspension (ECIS). Specifically, FIG. 1(*a*) illustrates a related art CIS, which does not utilize any instrumentation or extended circuitry on the load beam. Further details of the related art implementation of FIG. 1(*a*) are provided below for FIG. 2. FIG. 1(*b*) illustrates an example implementation of an ECIS where the load beam and flexure circuit manufactured as a single component with an outside interconnect connecting the load beam and the flexure circuit. The CIS can be folded from bottom to top by folding the interconnect as shown at 100, thereby maintaining the connection between the load beam and the base plate. Further details of the implementation of FIG. 1(*b*) are provided below for FIGS. 3 and 4. FIG. 1(*c*) illustrates an example implementation of an ECIS utilizing a via 101 placed within the load beam to provide electrical connections between the flexure circuit and the load beam. Further details of the implementation of FIG. 1(*c*) are provided in FIGS. 5-7. FIG. 1(*d*) illustrates an implementation of an ECIS utilizing a via 102 placed outside the load beam to provide electrical connections between the flexure circuit and the load beam. Further details of the implementation of FIG. 1(*c*) are provided in FIG. 11. FIG. 1(*e*) illustrates an implementation of an ECIS utilizing an folded interconnect, where connections of the flexure circuit 103 are folded over and onto the load beam. Further details of the implementation of FIG. 1(*e*) are provided in FIG. 12. FIG. 1(*f*) illustrates an application of the example implementation of FIG. 1(*c*), where a semi collocated micro-actuator (SCLMA) is implemented on the load beam. Further details of applying a SCLMA in the example implementations are provided in FIGS. 17-19.

Figure 1A:
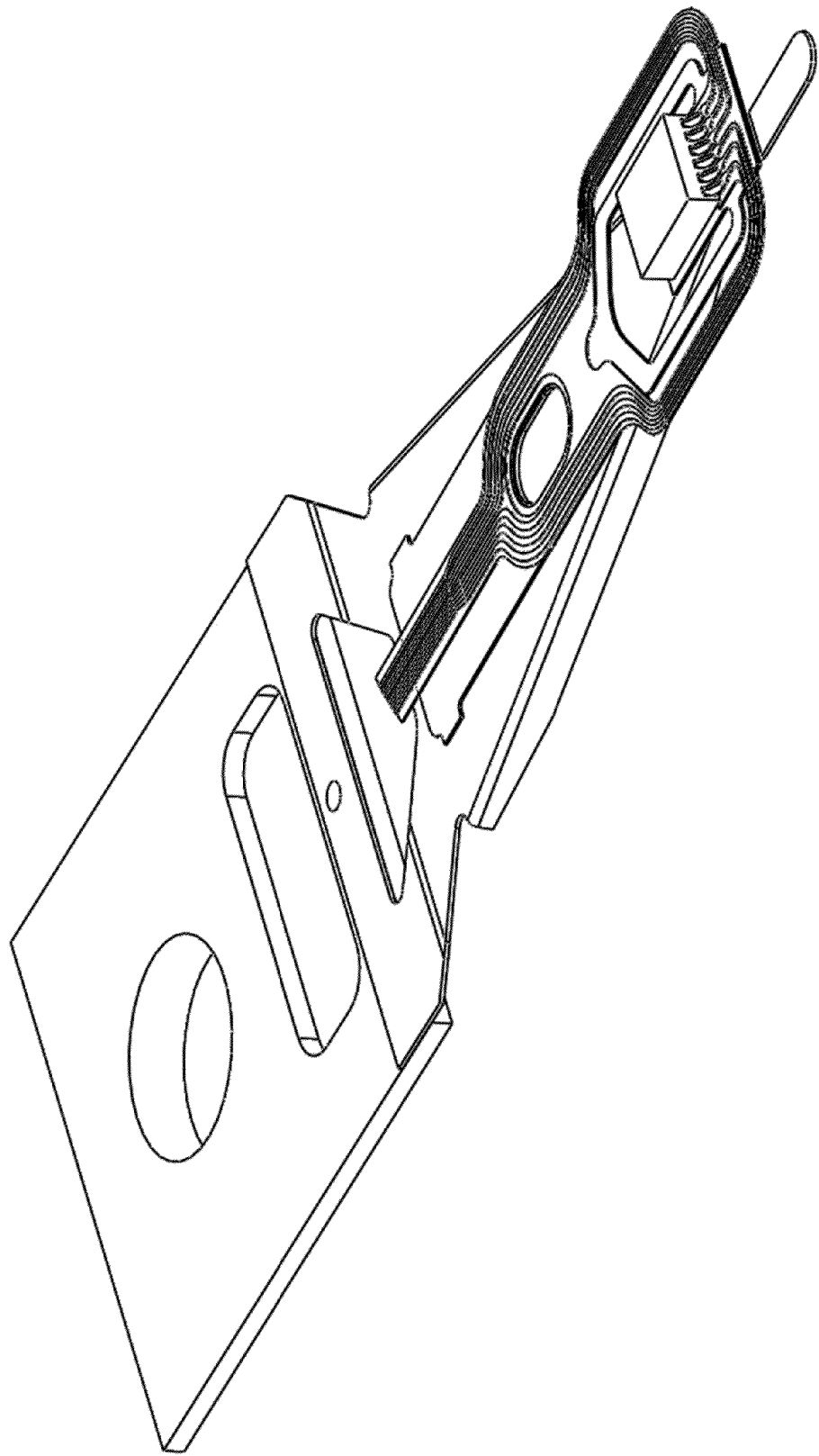
FIGS. 1(a) to 1(f) illustrate a related art and example implementations of an extended circuit integrated suspension (ECIS), and an example application of the example implementations.
Figure 1C:
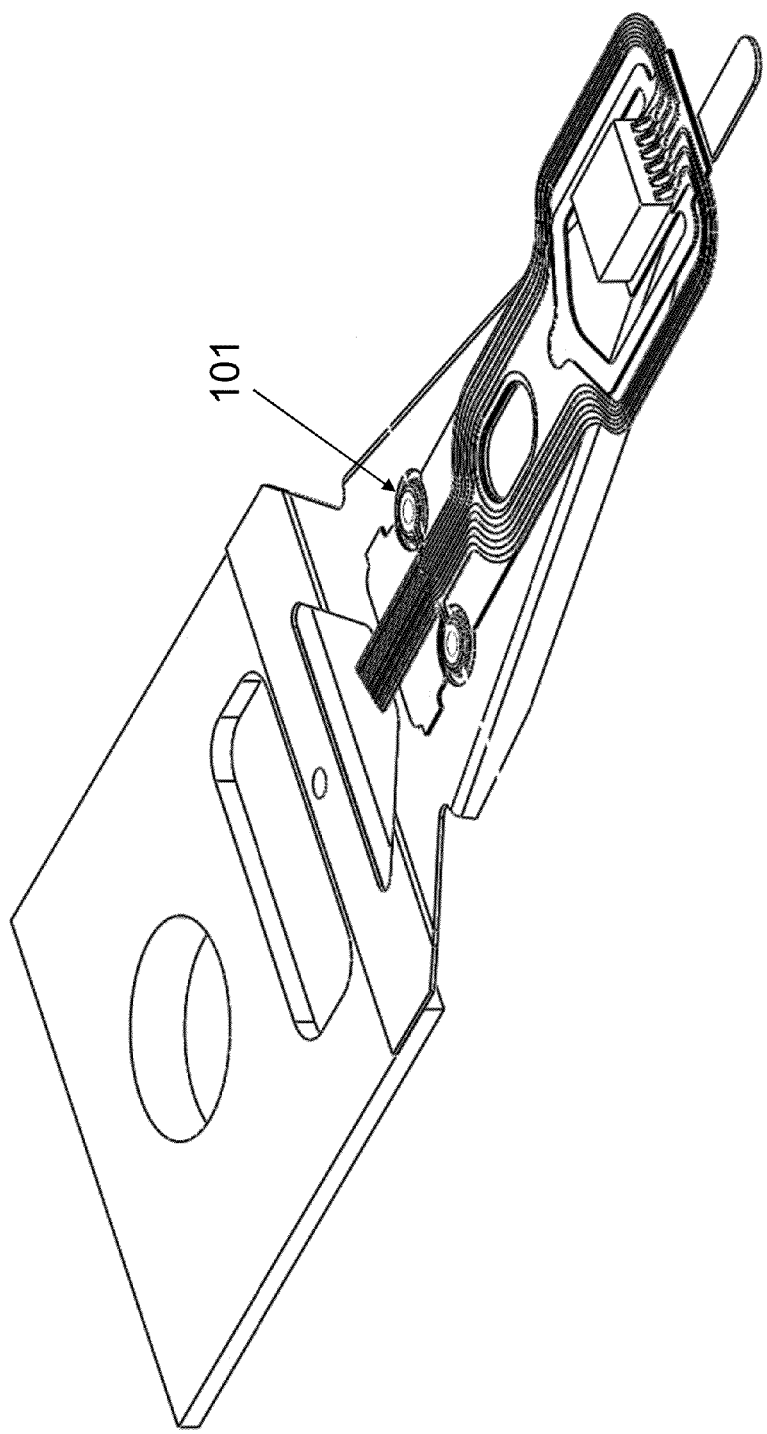
Figure 1B:
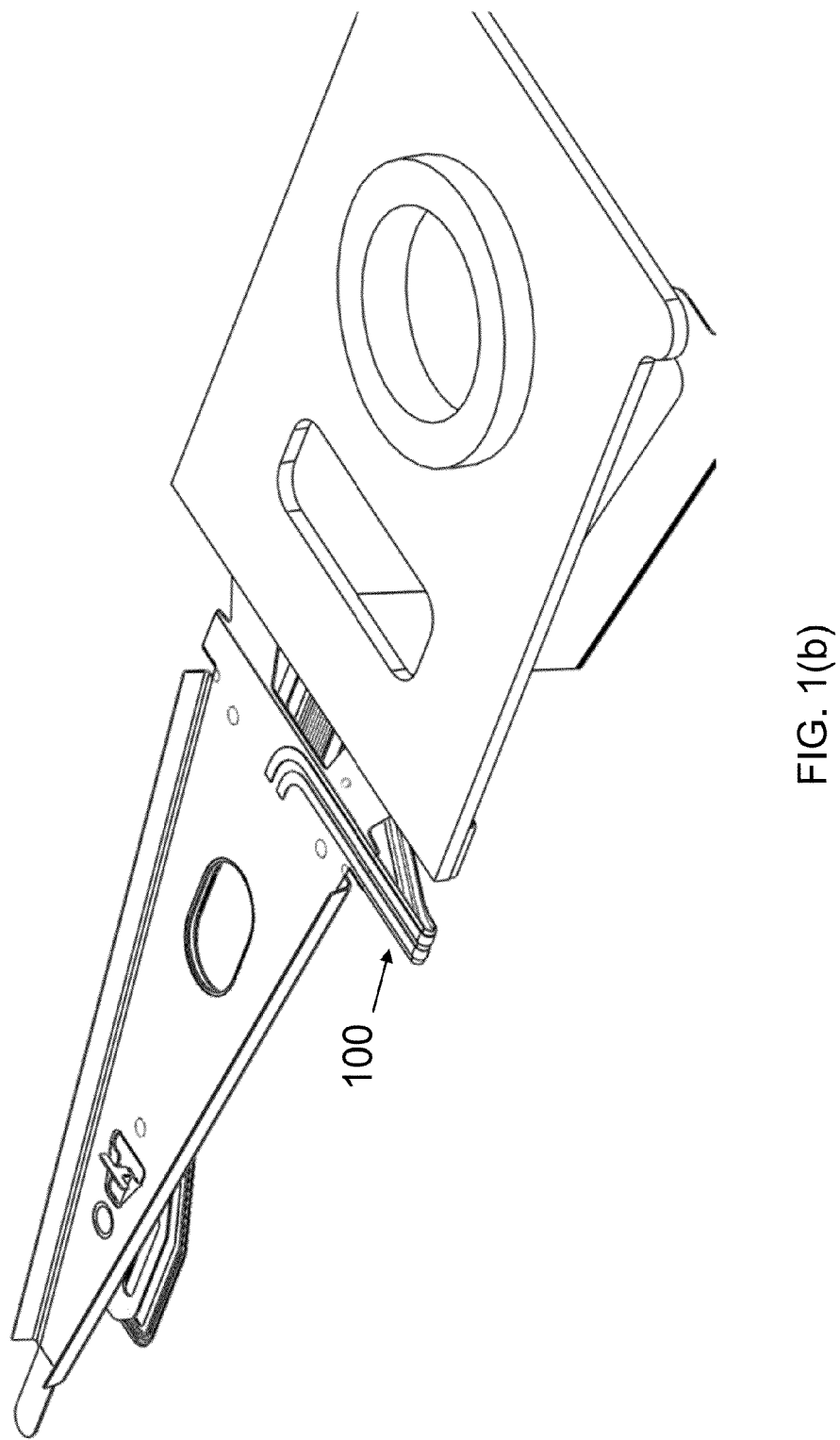
Figure 1D:
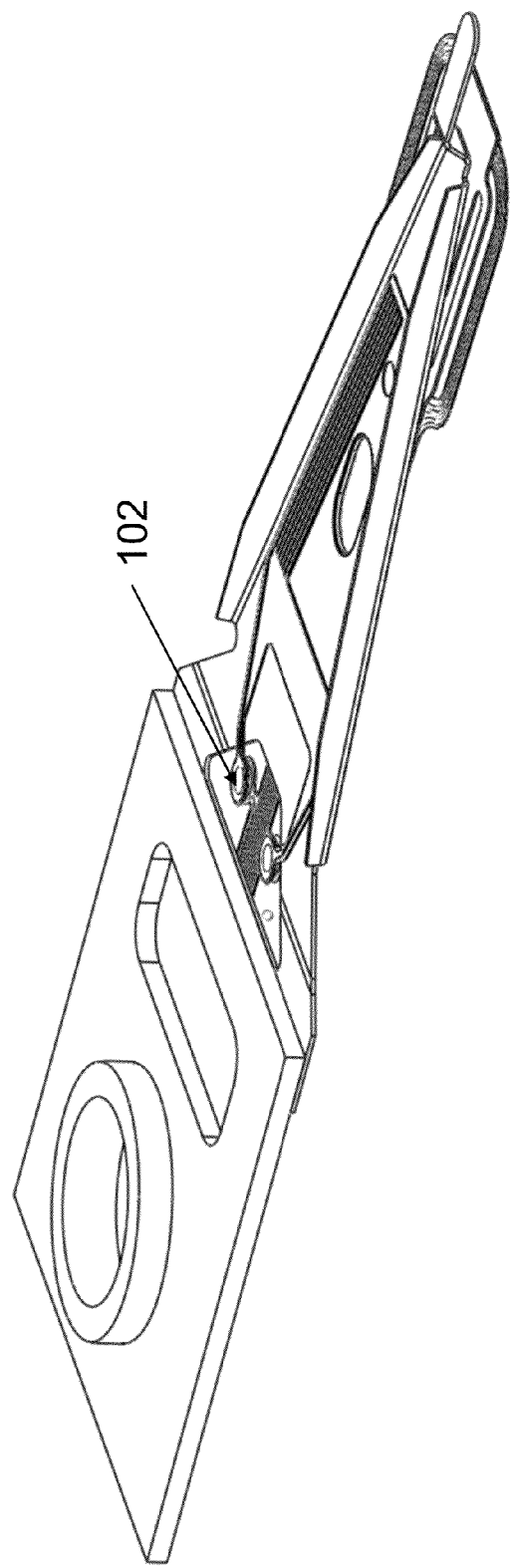
Figure 1E:
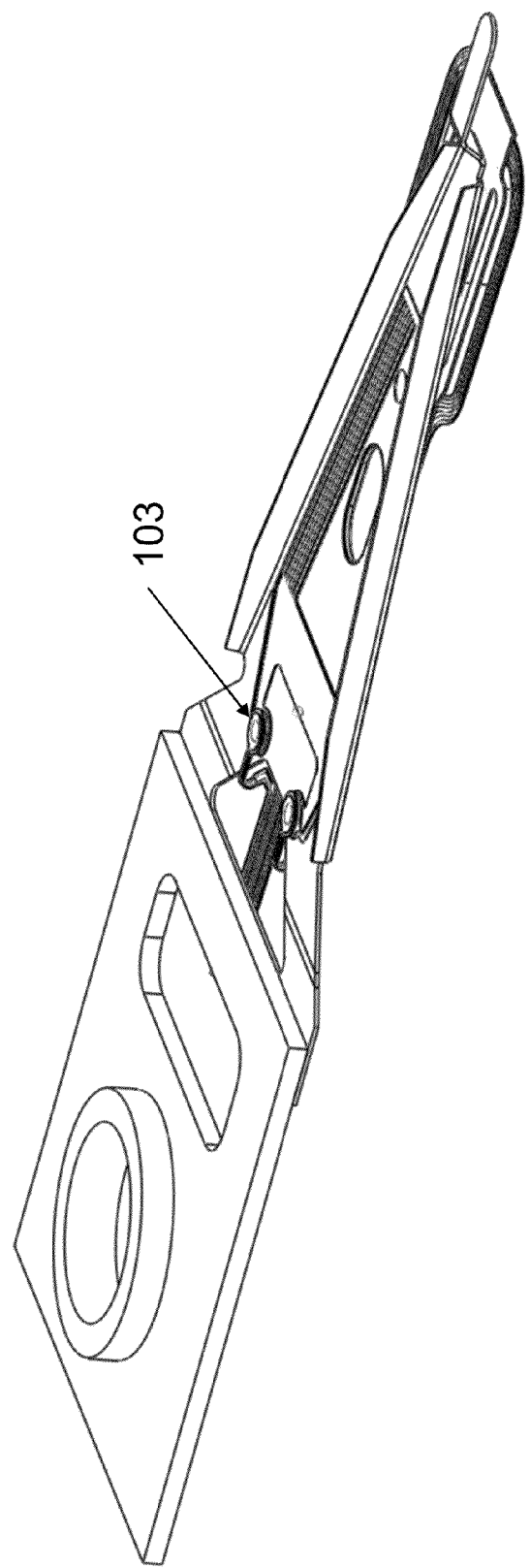
Figure 1F:
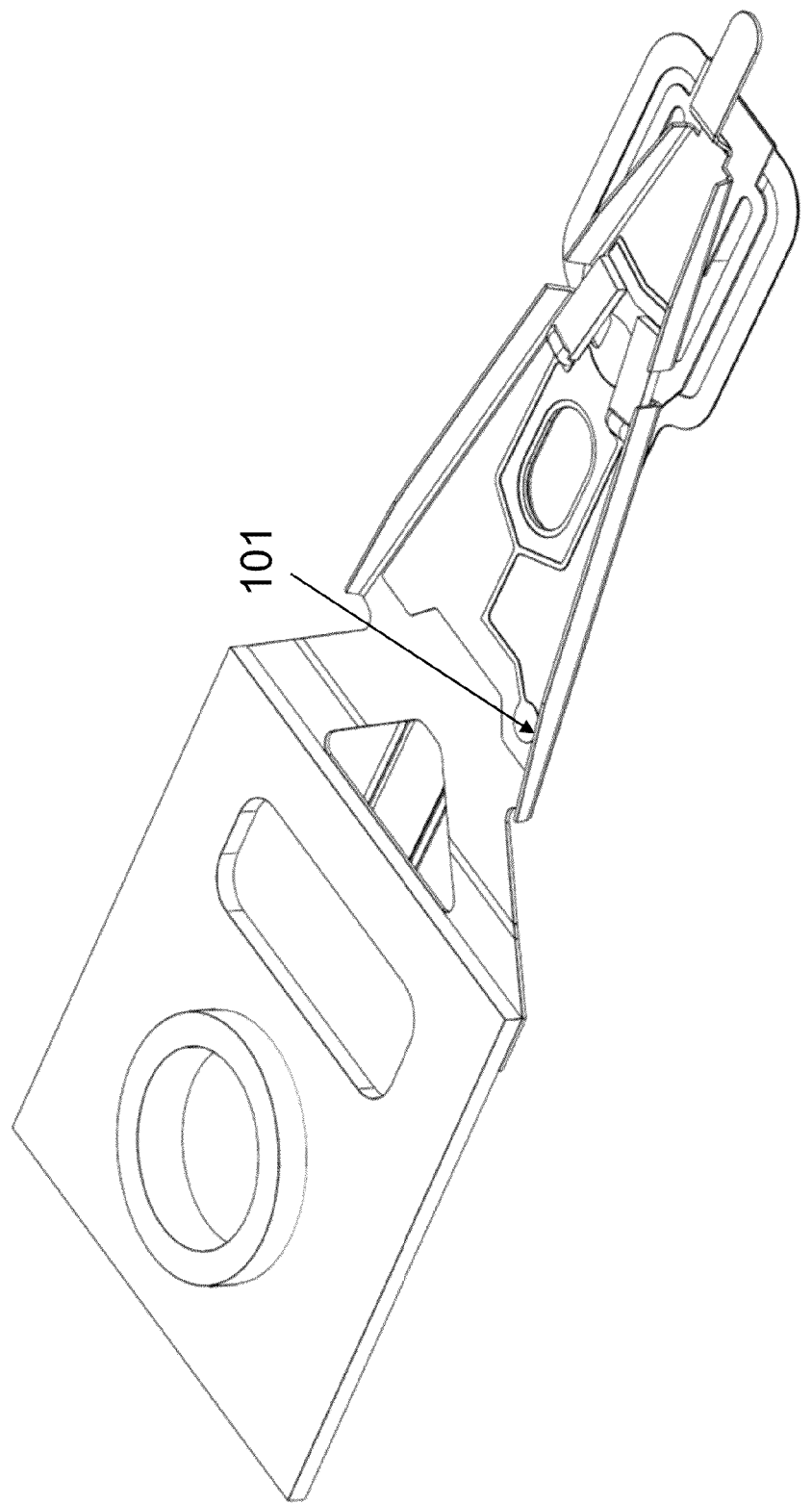
Figure 2:
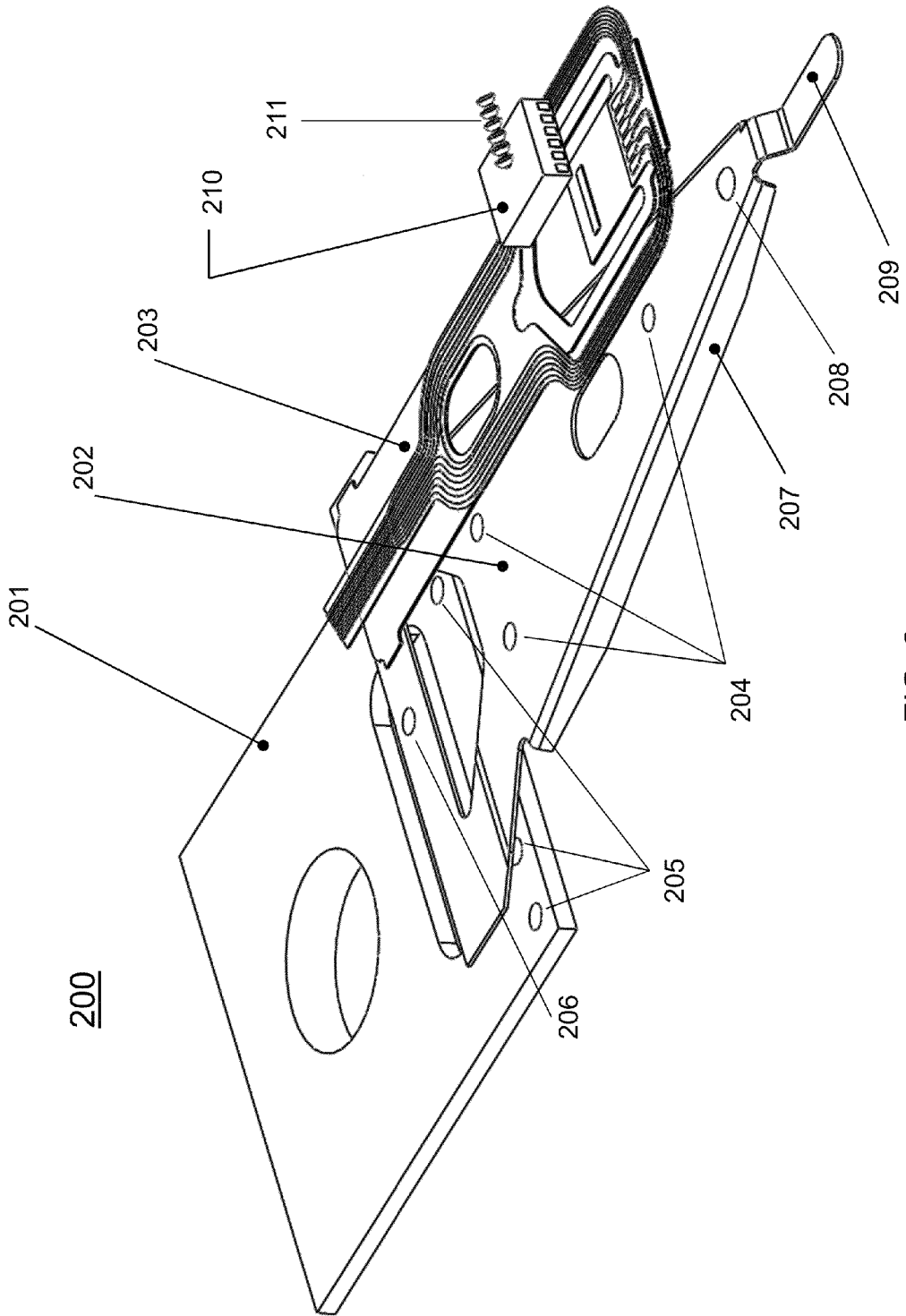
FIG. 2 illustrates a view of a related art circuit integrated suspension.

FIG. 2 illustrates a view of a related art circuit integrated suspension 200. The suspension has three separate parts: the base plate 201, the load beam 202, and the flexure circuit 203. The load beam and flexure circuit are made separately, and welded together via flexure circuit/load beam welds 204. Load beam/baseplate welds 205 are provided to weld the load beam to the baseplate, and a center weld 206 is provided to weld the flexure circuit to the base plate. The load beam 202 may be formed to provide rails 207, one or more dimples 208 and a head lift tab 209, depending on the desired implementation. The flexure circuit 203 also includes a read/write head 210 and solder jets 211 to facilitate connections between the read/write head and the flexure circuit. However, as shown in FIG. 2, there are no interconnects to connect the load beam to the flexure circuit electrically, and no circuitry is disposed on the load beam.

Figure 3:
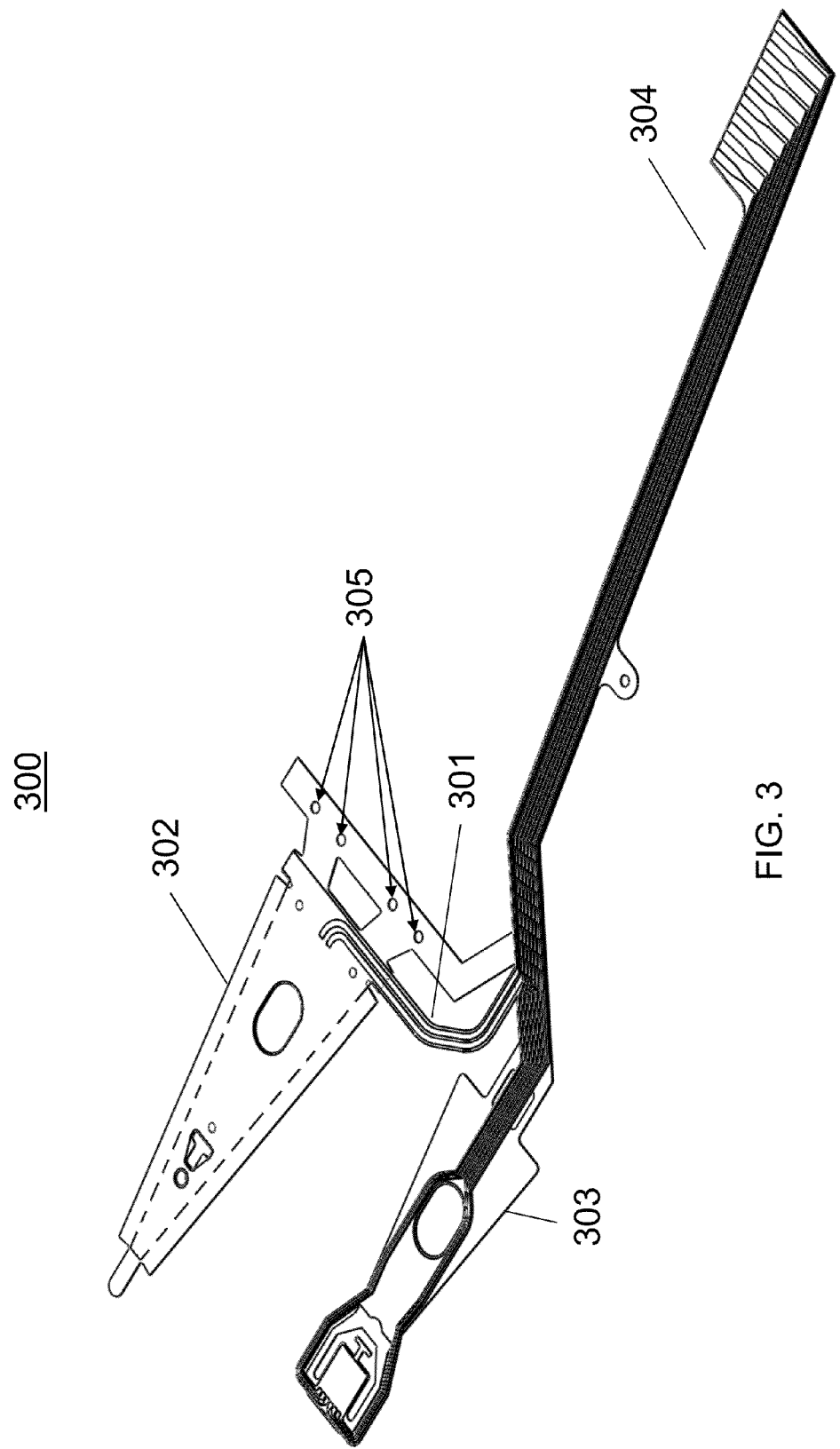
FIGS. 3 and 4 illustrates views of an ECIS, in accordance with a first example implementation.
Figure 4:
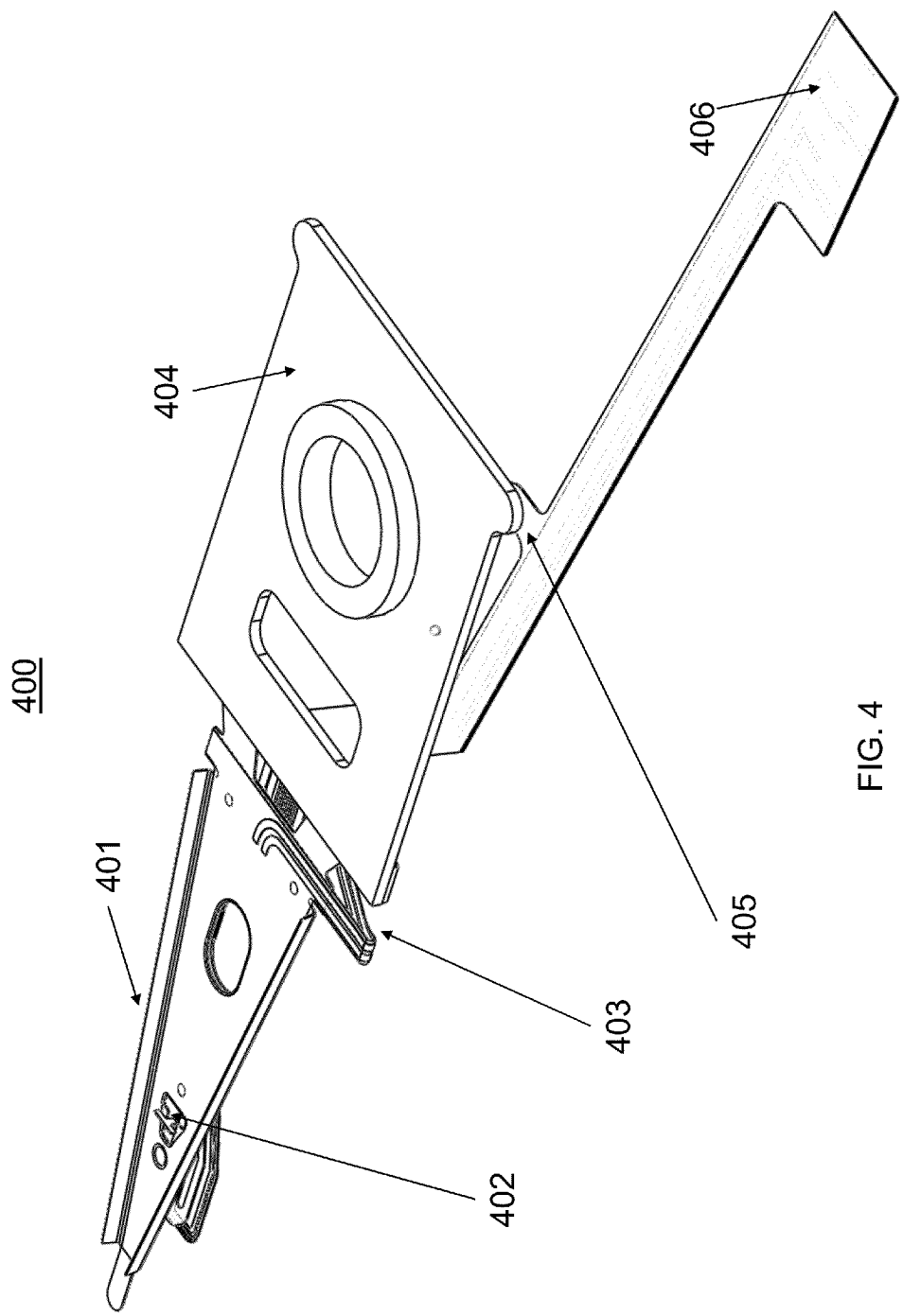

FIGS. 3 and 4 illustrates views of an ECIS, in accordance with a first example implementation. In the first example implementation, the load beam and flexure circuit are manufactured as a single component by being manufactured in the same manufacturing panel. Interconnects may be provided as part or as a connection portion connecting the load beam and the flexure circuit when the flexure circuit and the load beam are manufactured as a single component. Alternately, exterior interconnects may also be used. The interconnects are then folded when the load beam and flexure circuit are folded together.

FIG. 3 illustrates the first example implementation 300 in a flattened view from the trace side. The load beam 302 and the flexure circuit 303 are manufactured as a single component, along with connecting portion 301 and the tail of the flexure circuit 304. Welds 305 are provided to allow the load beam to be welded to the base plate. By manufacturing the load beam 302 and the flexure circuit 303 as a single component with a connecting portion 301 connecting the load beam and the flexure circuit laterally, a process of folding permits the flexure circuit to be placed on one side while permitting circuit traces to be disposed on the opposite side of the load beam, wherein the component can be folded over by folding connecting portion 301. The load beam 302 and the flexure circuit 303 may be connected together by connecting traces, which can be used as connecting portion 301, displaced alongside connecting portion 301, or provided additionally depending on the desired implementation.

FIG. 4 illustrates the first example implementation when the component 400 is formed, folded and welded to the base plate 404. As shown in the view of FIG. 4, rails 401 and limiter 402 may be formed depending on the desired implementation. The connecting portion 403 is folded over to fold the load beam and the flexure circuit together. An additional baseplate weld 405 may be provided on the flexure tail 406 to secure the flexure to the baseplate.

Figure 5:
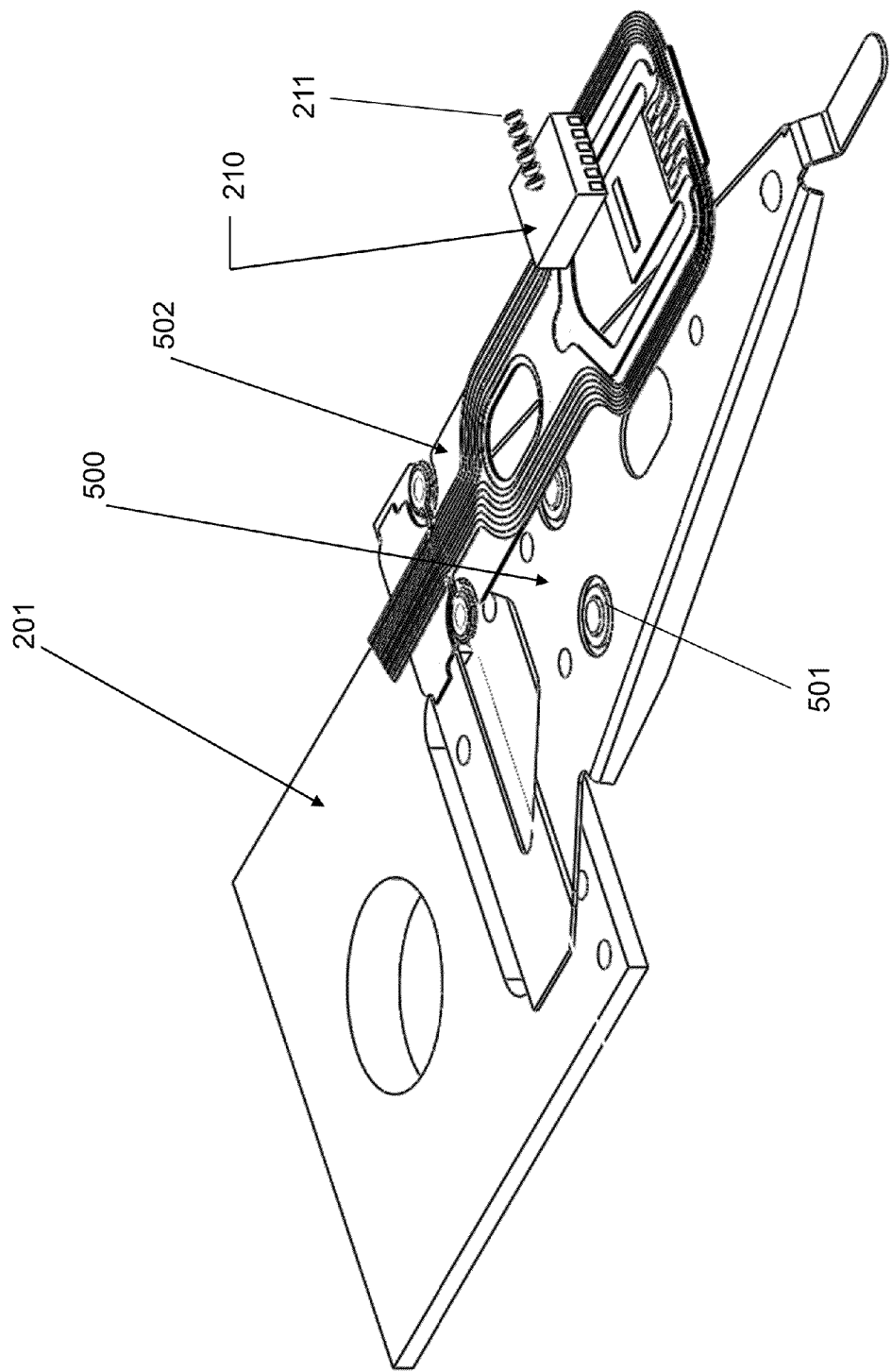
FIGS. 5-7 illustrate views of an ECIS, in accordance with a second example implementation.
Figure 6:
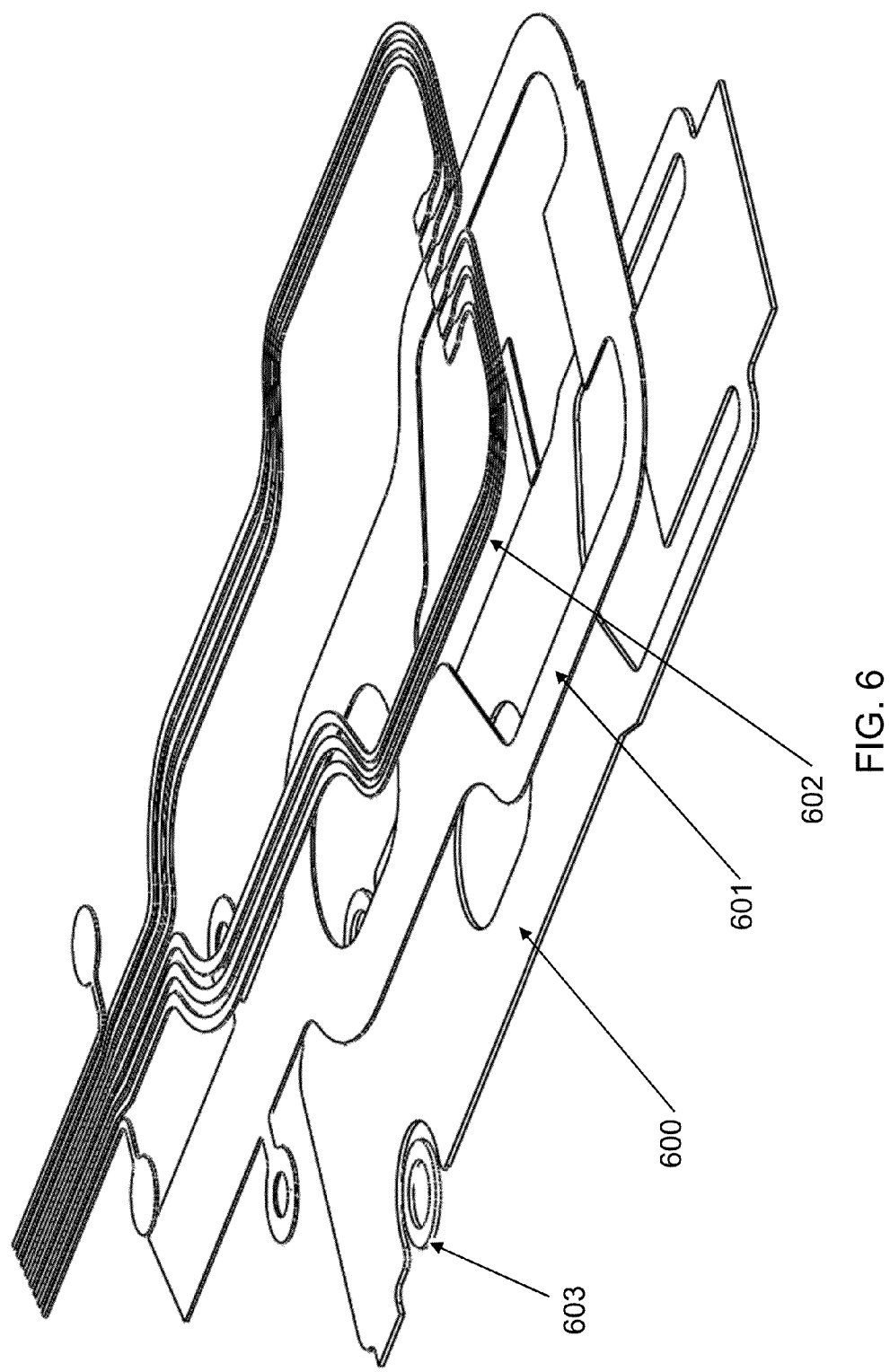
Figure 7:
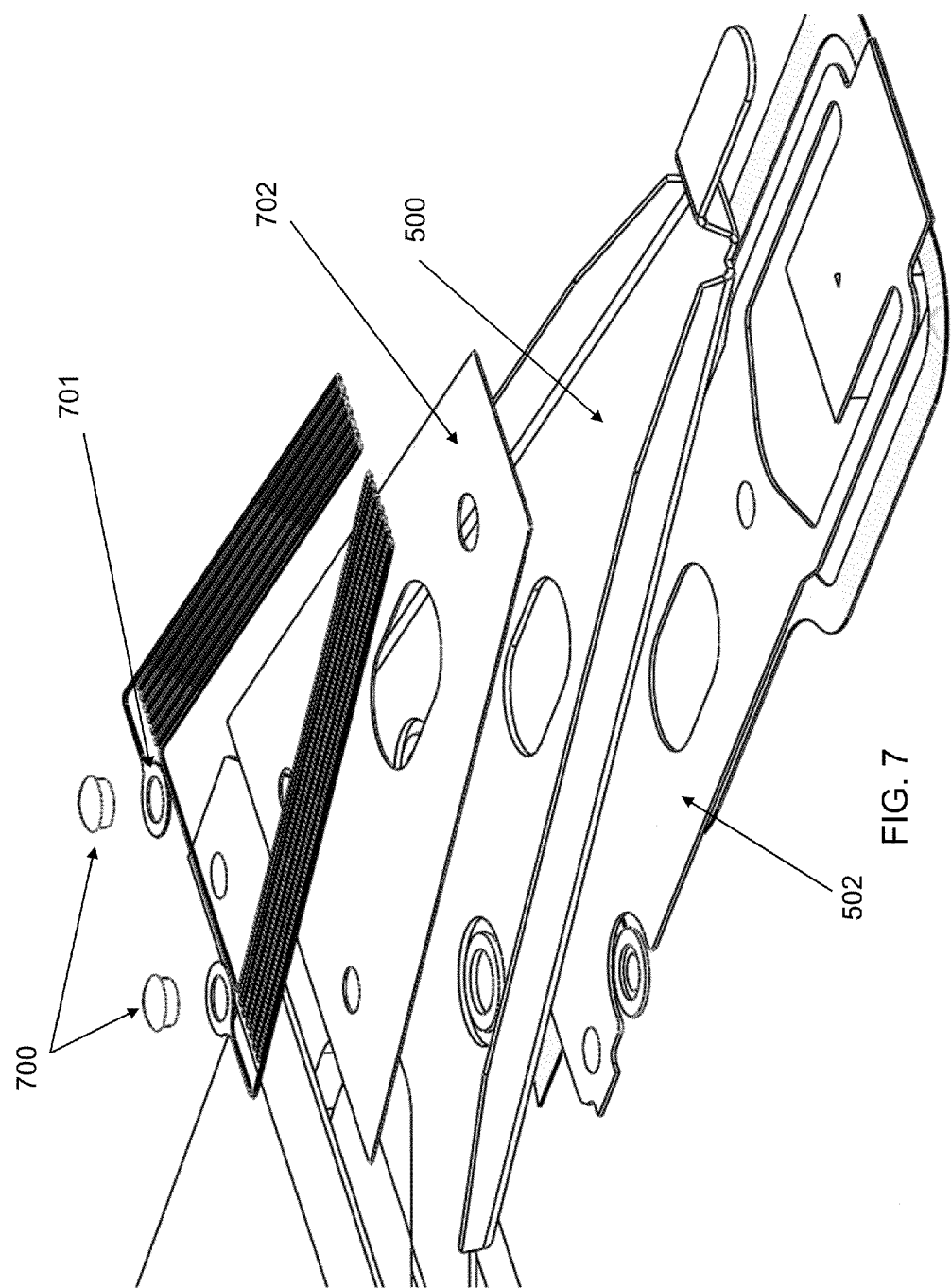

FIGS. 5-7 illustrate views of an ECIS, in accordance with a second example implementation. In the second example implementation, circuitry is disposed onto one side of the load beam to connect with the flexure circuit on the opposite side by a via. The manufacturing panel for the second example implementation may involve separate panels for the flexure circuit and the load beam.

FIG. 5 illustrates an exploded front view of the second example implementation. The load beam 500 is modified to have one or more isolation rings 501 for vias formed in the stainless steel layer of the load beam 500. The flexure circuit 502 is similarly modified to provide electrical connections to the load beam. In the second example implementation, not only traces, but sensors and actuators can thereby be disposed onto the load beam opposite to the flexure circuit by use of the vias and isolation rings, which provide backside access to the flexure circuit. In comparison to the first example implementation, in which a common ECIS panel is used for the flexure circuit and the load beam to manufacture the flexure circuit and the load beam as a single component, a separate panel may be employed in this and other ECIS implementations described below. A common element to the first example embodiment described above, are that the load beam component and flexure circuit can be mated and connected by welds. The circuitry opposing the flexure circuit can then interact with the flexure circuit through at least one via disposed on the load beam itself.

FIG. 6 illustrates a front side exploded view of the flexure circuit 502 shown in FIG. 5, in accordance with the second example implementation. The stainless steel (SST) layer 600, the polyimide layer 601 and the conductive circuit layer 602 are modified based on the addition of one or more isolation rings and vias 603 provided on the SST layer 600. The conductive circuit layer 602 may utilize copper traces or other conductive materials, depending on the desired implementation.

FIG. 7 illustrates a back side exploded view of the flexure circuit 502 and load beam 500 shown in FIG. 5, in accordance with the second example implementation. Using the modified flexure circuit 502 and load beam 500, one or more interconnect vias 700 may be utilize to place a circuit on the top of the load beam and facilitate connections between the load beam circuit and the flexure circuit. The conductive layer 701 of the load beam circuit can be made of copper or other conductive materials and may have one or more holes in the pads for interfacing with the interconnect vias 700. The load beam circuit may also have a polyimide layer 702 to insulate the circuit from the load beam, if the load beam is made of a conductive material (e.g., stainless steel).

Figure 8:
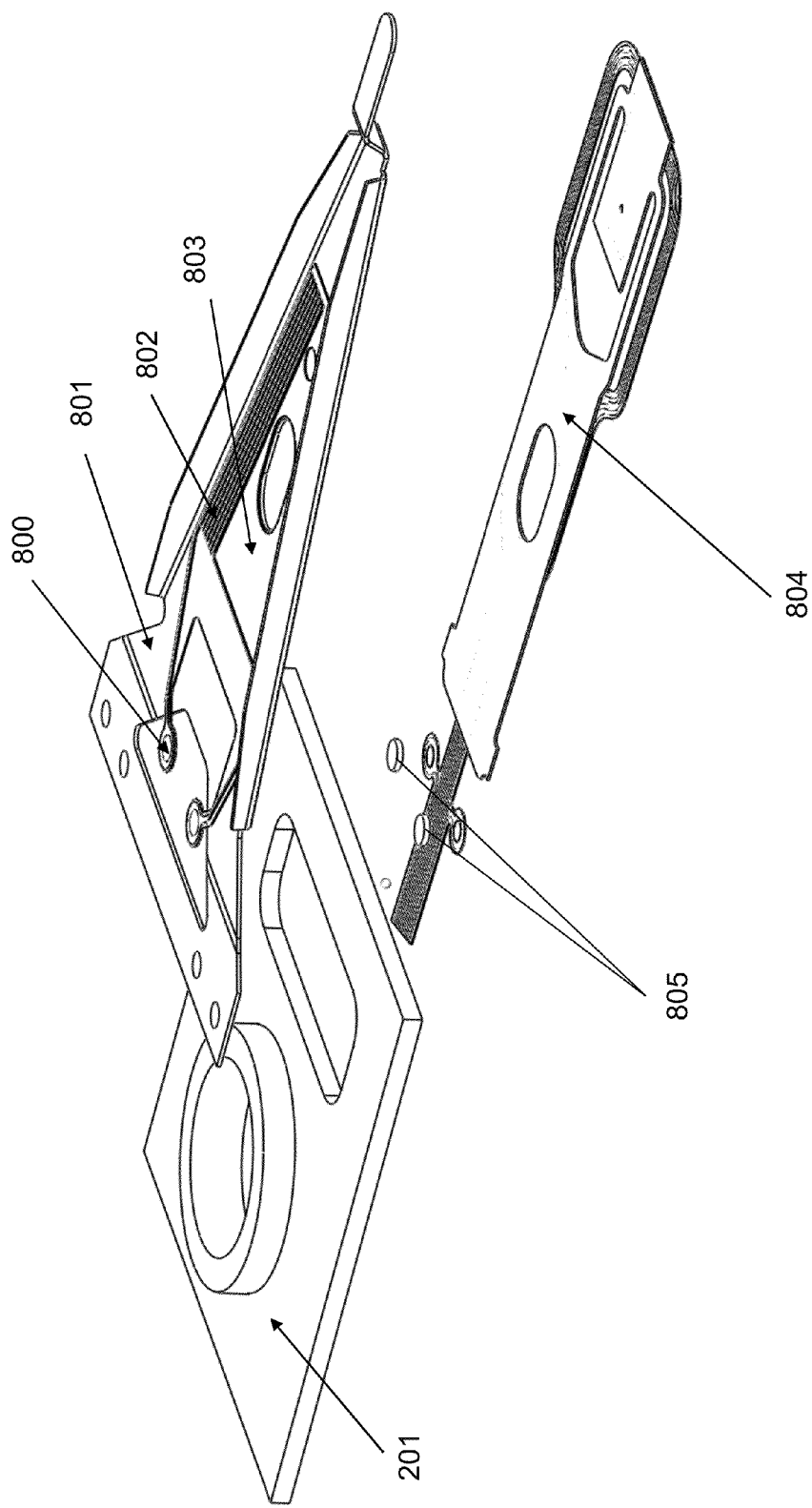
FIG. 8 illustrates a view of an ECIS, in accordance with a third example implementation.

FIG. 8 illustrates a view of an ECIS, in accordance with a third example implementation. In a third example implementation, one or more vias are disposed onto a portion of the base insulating layer disposed outside of the perimeter of the load beam. FIG. 8 illustrates the interconnect via features disposed outside the part edge in an exploded front side view of the ECIS. In FIG. 8, the via 800 is disposed at the polyimide layer 803 located in a space within the window of the hinge 801. The load beam circuit 802 can then be placed on the load beam and connected to the flexure circuit 804 through the via 800 by using solder bumps or anisotropic conductive film (ACF) 805.

Figure 9:
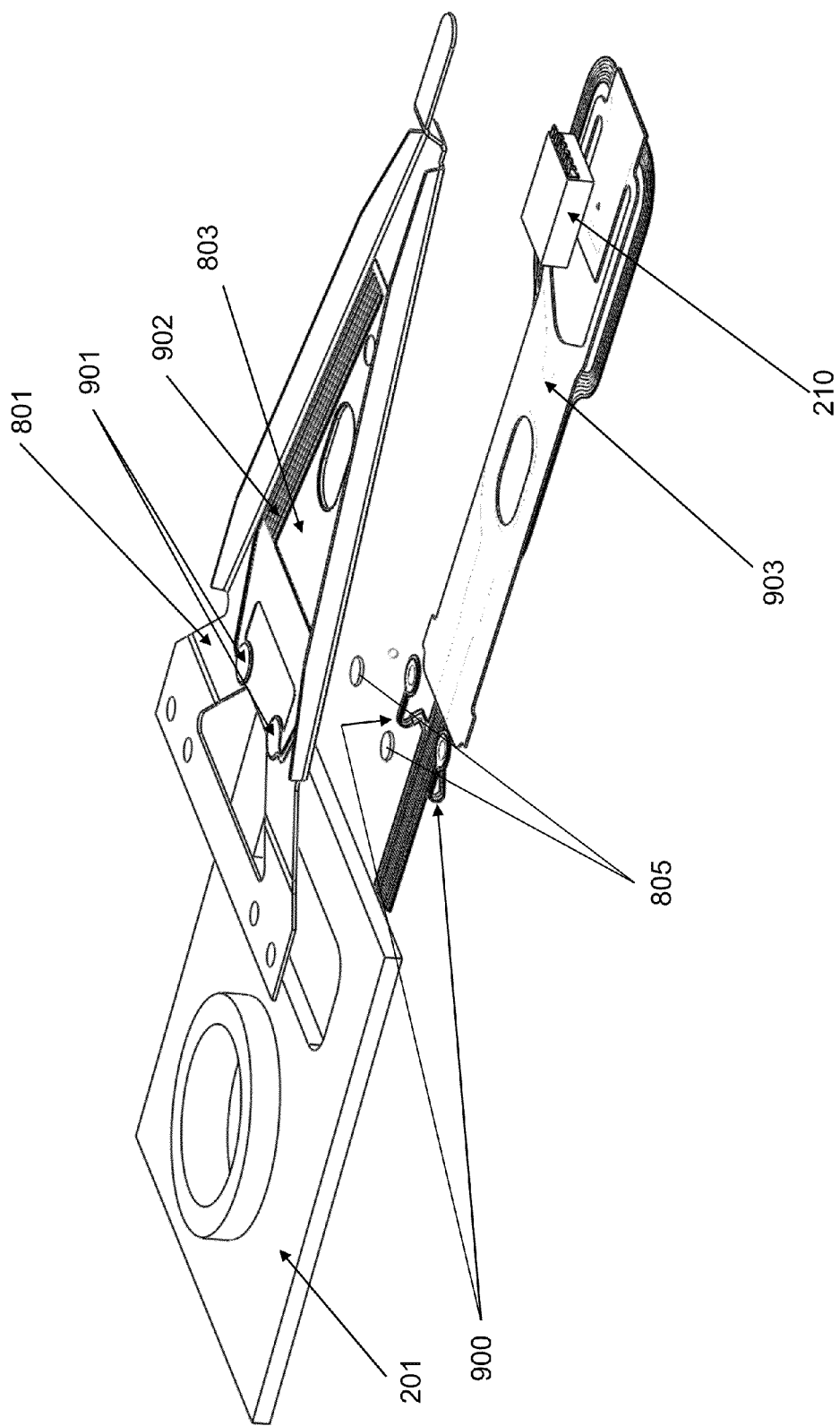
FIG. 9 illustrates a view of an ECIS, in accordance with a fourth example implementation.

FIG. 9 illustrates a view of an ECIS, in accordance with a fourth example implementation. In a fourth example implementation, circuitry is disposed onto a first side of the load beam to connect with the flexure circuit on the opposite side, by folding the connection portions of the flexure circuit to interact with the circuitry on the first side of the load beam.

In the exploded front view as shown in FIG. 9, one or more connection portions 900 of the flexure circuit are extended and folded over to connect to the connection portions or vias 901 of the circuitry disposed on the opposite side of the load beam. The connection portions 901 of the circuitry disposed on the opposite side of the load beam may also be extended and folded as needed. As illustrated in FIG. 9, the extension wraps around the load beam through the hinge window to the other side of the load beam.

Figure 10:
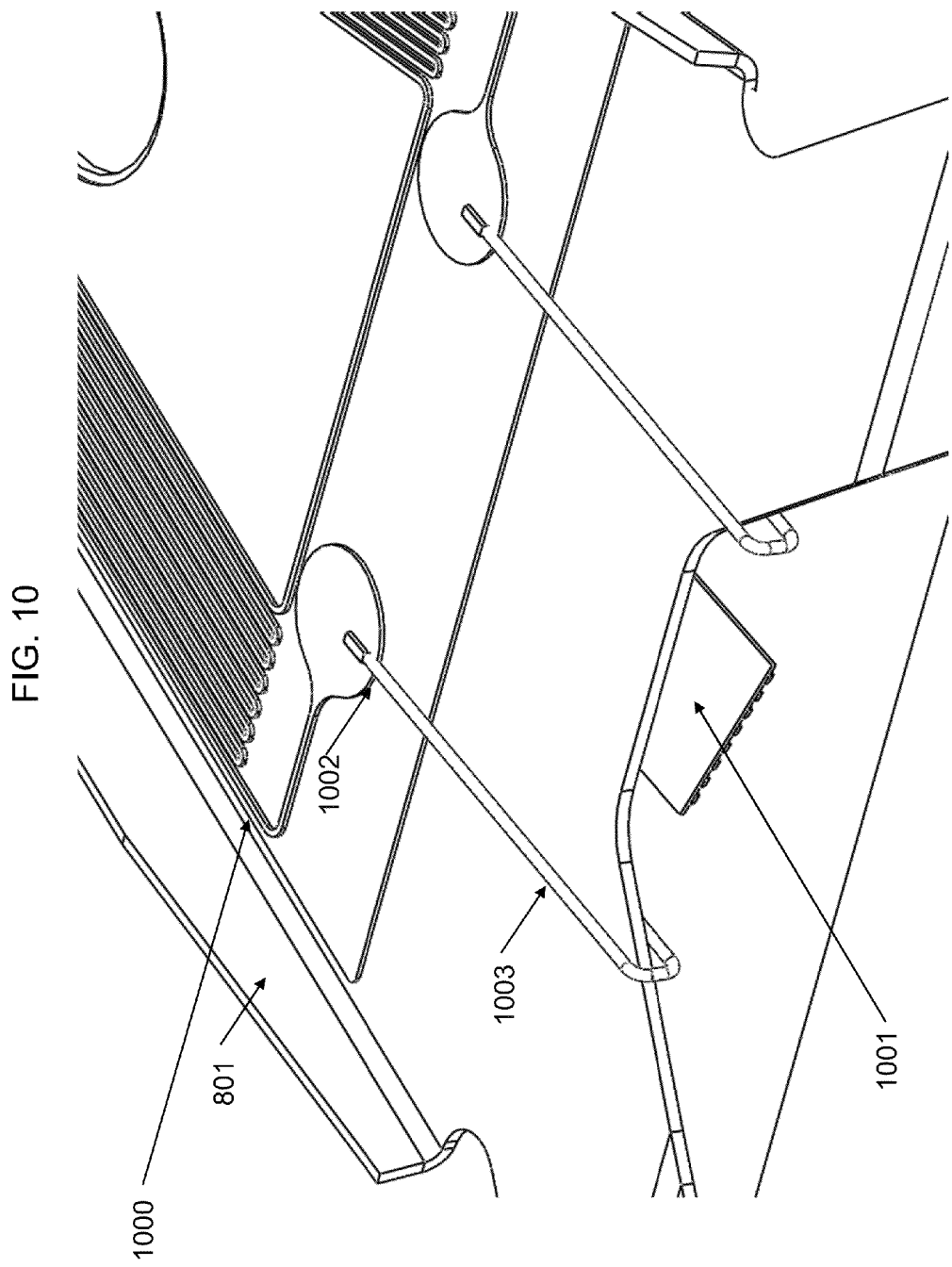
FIGS. 10 and 11 illustrate views of an ECIS, in accordance with a fifth example implementation.
Figure 11:
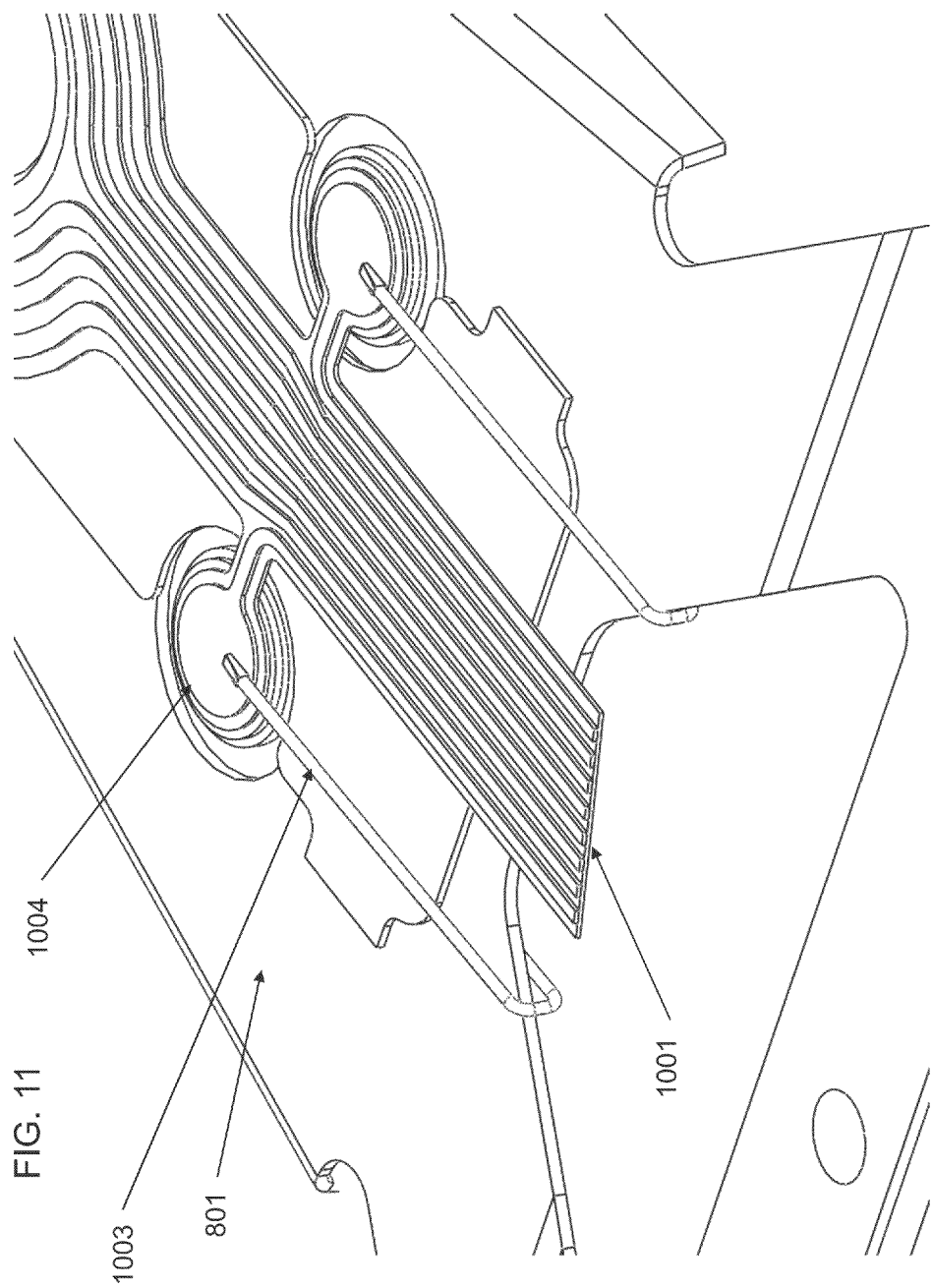

FIGS. 10 and 11 illustrate view of an ECIS, in accordance with a fifth example implementation. In a fifth example implementation, an electrical connection, (e.g., such as a wire, an interposer additional separate circuit), is provided from the connection portions of the circuitry disposed on the load beam to the connection portions of the flexure circuit. The electrical connection may be bonded, soldered or connected utilizing other methods. FIG. 10 illustrates a top view of a load beam and a flexure circuit utilizing an electrical connection (e.g., a wire) 1003 to connect the connection portion 1002 of the load beam circuit 1000 to the flexure circuit 1001 through the hinge window. FIG. 11 illustrates the bottom view of FIG. 10. The electrical connection 1003 connects to the connection portion 1004 of the flexure circuit.

Figure 12:
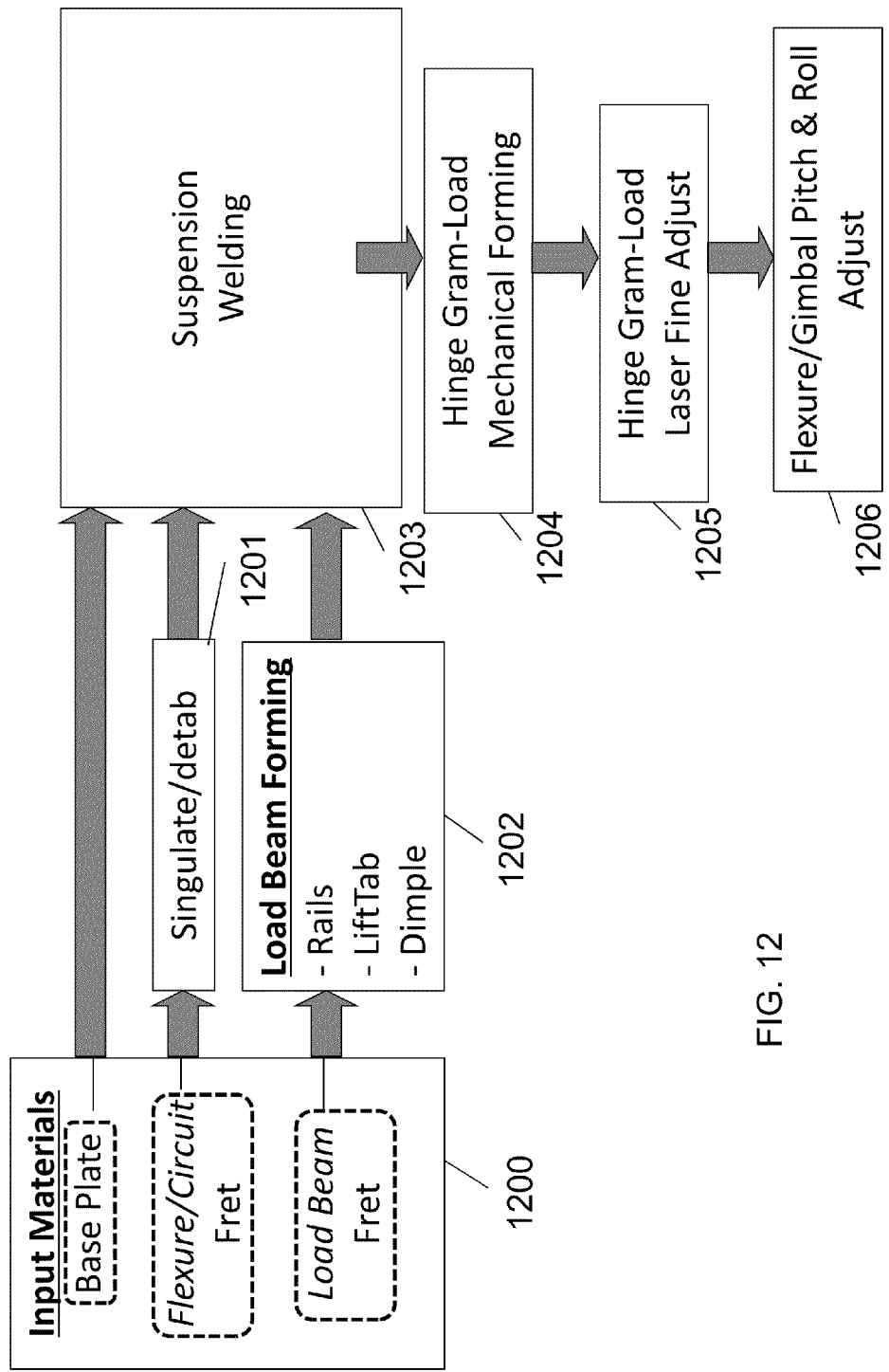
FIG. 12 illustrates a flowchart for manufacturing a related art suspension.

FIG. 12 illustrates a flowchart for manufacturing a related art suspension. The manufacture of a suspension involves taking input materials to form a base, a flexure circuit and a load beam 1200. Because the flexure circuit and the load beam are manufactured by using different panels, the flexure circuit undergoes a singulate/detab at 1201, while the load beam is formed separately at 1202. The flexure circuit and load beam are welded together at 1203, a hinge gram load mechanical forming is conducted at 1204, a hinge gram load laser adjustment is conducted at 1205 and the flexure is adjusted for pitch and roll at 1206, either mechanically or by laser, or both.

Figure 13:
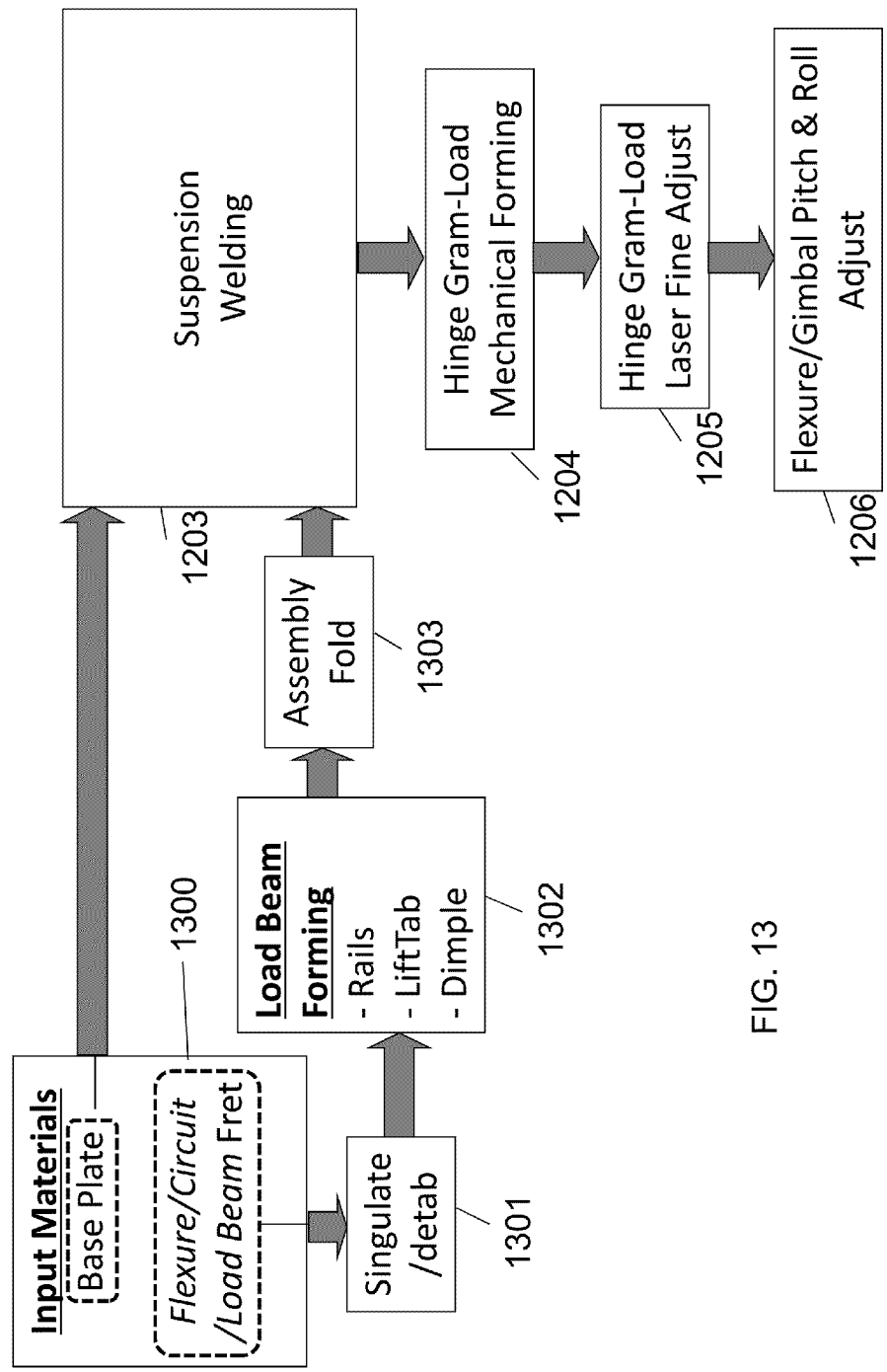
FIG. 13 illustrates a flow diagram for manufacturing the load beam and flexure circuit as a single component, in accordance with the first example implementation.

FIG. 13 illustrates a flow diagram for manufacturing the load beam and flexure circuit as a single component, in accordance with the first example implementation. The process is similar to the flow diagram of FIG. 12, with some modifications. The load beam is made in same panel as flexure at 1300. The singulate/detab may then be performed on the single component at 1301, while the load beam portion of the single component is formed at 1302. An additional folding is conducted to fold the flexure circuit onto the load beam at 1303.

Figure 14:
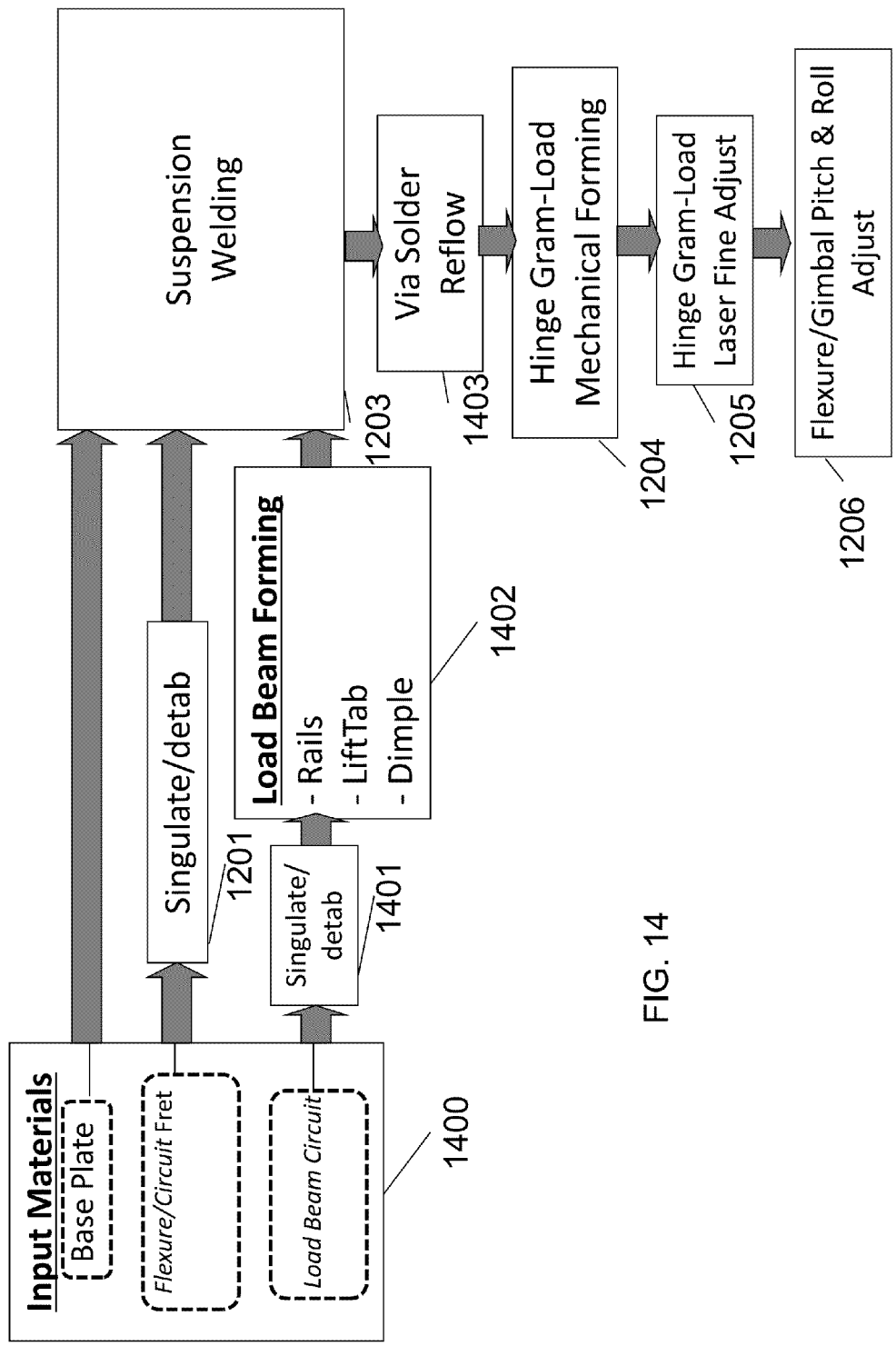
FIG. 14 illustrates a flow diagram for manufacturing the load beam and flexure circuit, in accordance with example implementations.

FIG. 14 illustrates a flow diagram for manufacturing the load beam and flexure circuit, in accordance with example implementations. In the example shown in FIG. 4, the load beam circuit is manufactured separately from the flexure and the base plate at 1400. The load beam circuit undergoes a singulate/detab at 1401, and the load beam forming is conducted at 1402. A via solder reflow 1403 may be performed to form solder bumps between the vias of the load beam and the flexure circuit. Electrical connections (e.g., wire, interposer), may also be formed and soldered or bonded to the connection portions of the flexure circuit and the load beam circuit at 1403.

In any of the example implementations indicated above, any kind of circuitry, including any traces, circuits, discrete components, passive or active, Surface Mount Devices (SMD), copper dummy mass volumes, additive passive dampers, additive active dampers, any sensors, wave guides, polymer waveguide, lasers, HAMR laser drivers, HAMR laser power sensors, optical devices, Thermal Asperity (TA) sensors, preamps, Media Burnishing Force Sensors, Multi-Disk Write (MDW) sensors/actuators, Piezoelectric (PZT) devices (sensing or driving), polysensitive layers, micro-actuators, milli-actuators, co-located gimbal based dual stage actuators (DSA), and any other electric circuitry, can thereby placed onto the load beam and be electrically connected. The example implementations described above permit the circuitry to be placed on the side of the load beam that is opposite to the flexure circuit. The example implementations may also allow for the placement of any sensors and other additional circuitry onto the load beam. For example, an optical instrument placed onto the load beam can thereby detect mechanical strains for bending, torsion, thermally induced strains, vibrations and other measurable parameters depending on a desired implementation.

Figure 15:
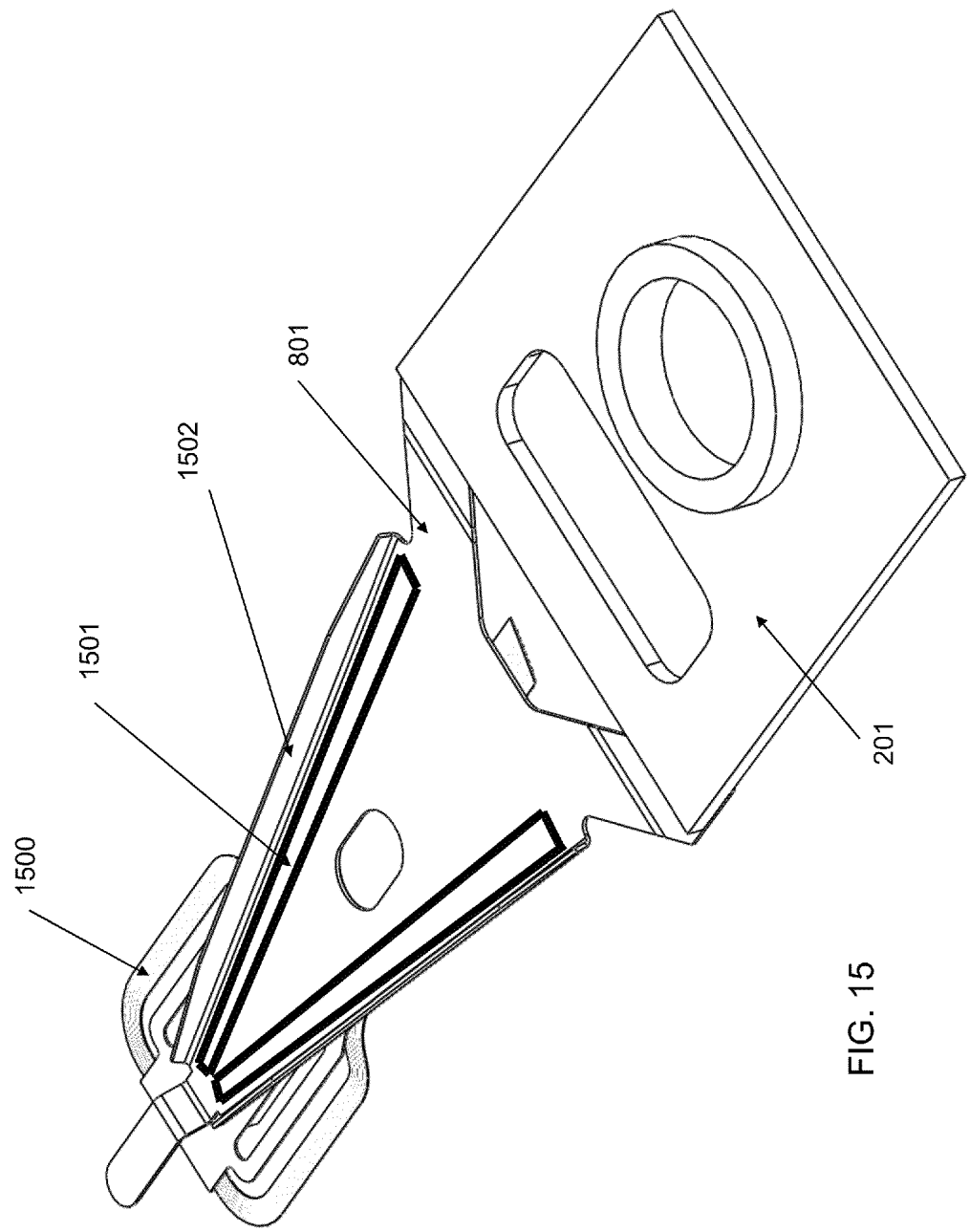
FIG. 15 illustrate an example application of a ECIS.

However, passive trace layers may also be placed on the load beam if desired. FIG. 15 illustrate an example application of a ECIS with passive components on the load beam, that are not electrically connected to the flexure circuit 1500. In the example of FIG. 15, passive unconnected trace layers are deposited on an insulating polyimide layer. In the passive application, there is no connection to the ECIS. Three extra layers (base polyimide, copper and cover polyimide) are disposed on the load beam, and patterned as desired for added stiffness, or tuning mass distribution. FIG. 15 illustrates stiffness being added near the rails in the flat portion, as an example. Thus, three added material layers 1501 can be disposed even on the rails 1502.

In another example application, piezoelectric (PZT) devices (sensing or driving) can be used as semi-collocated micro-actuators (SCLMA) based on the above example implementations.

Figure 16:
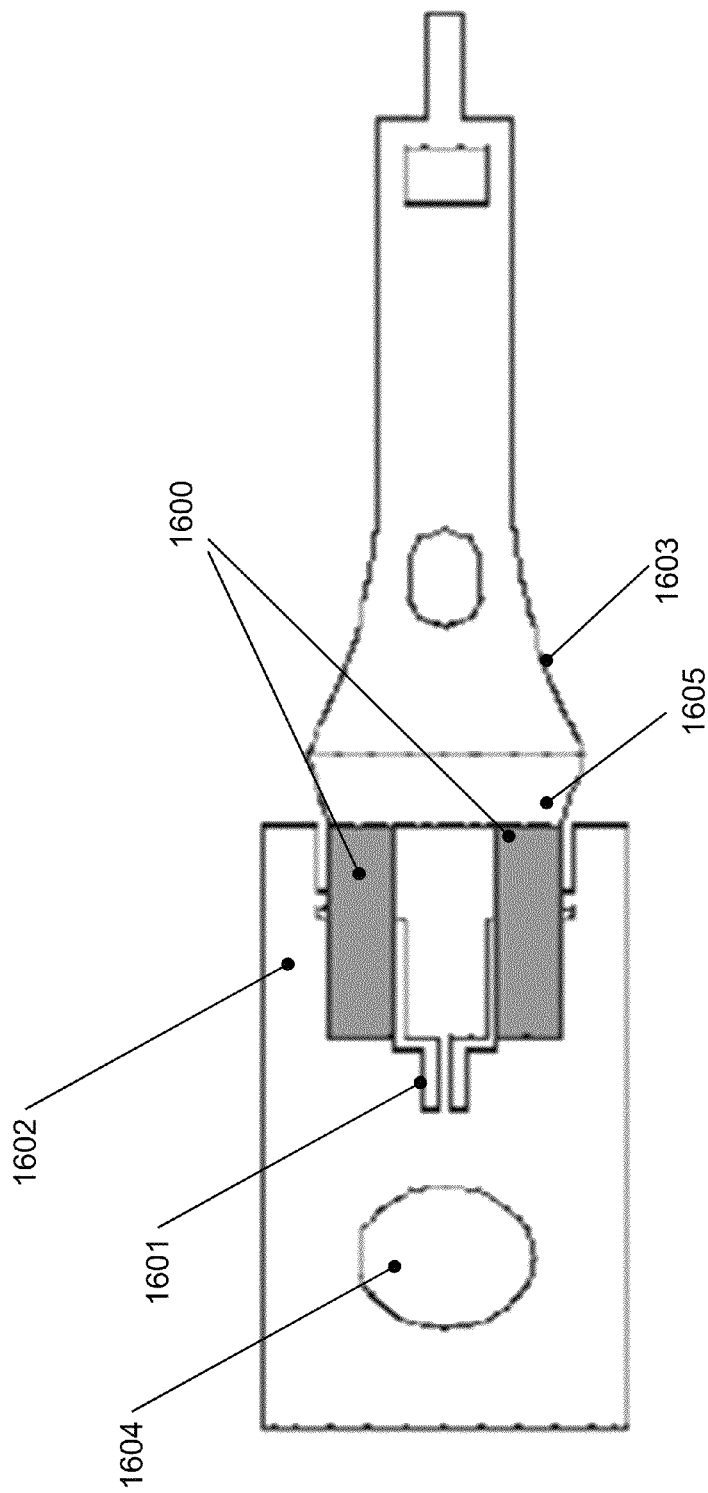
FIG. 16 illustrates a related art milli-actuator utilized in a suspension for hard disk drives.

FIG. 16 illustrates a related art milli-actuator utilized in a suspension for hard disk drives. A related art suspension includes an extended base plate 1602 and an elongated portion 1603 for the suspension. The extended base plate may include side and or pivotal hinges 1601, slits, and a swage hole 1604. The elongated portion may have a spring region 1605 connecting the load beam to the extended base plate. The load beam may have holes for welding, a dimple, and a lift tip. Milli-actuators 1600 in the related art may have PZT motors that are located far from the slider, move the whole load beam laterally and excite resonances in the E-Block arms and the load beams. Collocation of the mili-actuators at the extended base plate of the suspension moves a much smaller mass and is less prone to excite undesirable resonances. Some flexure based micro-actuators in the related art may require a major architecture change to the gimbal, especially while PZT motors are to be located in and around the gimbal. As a result, there may not be much space to work with for gimbal based micro-actuators. There is a need to preserve gimbal structures that are optimized in pitch, roll, thrust, yaw and lateral stiffnesses for best slider flying characteristics, yet enable micro-actuation that is collocated with the slider.

In an example application, two PZT motors may be arranged near the tip and around a slotted loadbeam for use as a SCLMA. Traces may be located onto the loadbeam to couple the PZT motors to additional circuitry, such as a controller. The PZTs can be configured such that when a first PZT device is driven to contract, a second PZT device can be driven to expand. As the first PZT is driven to contract and the second PZT is driven to expand, a portion of the load beam can be made to move or deform slightly, thereby enabling lateral movement at the slider head.

Figure 17:
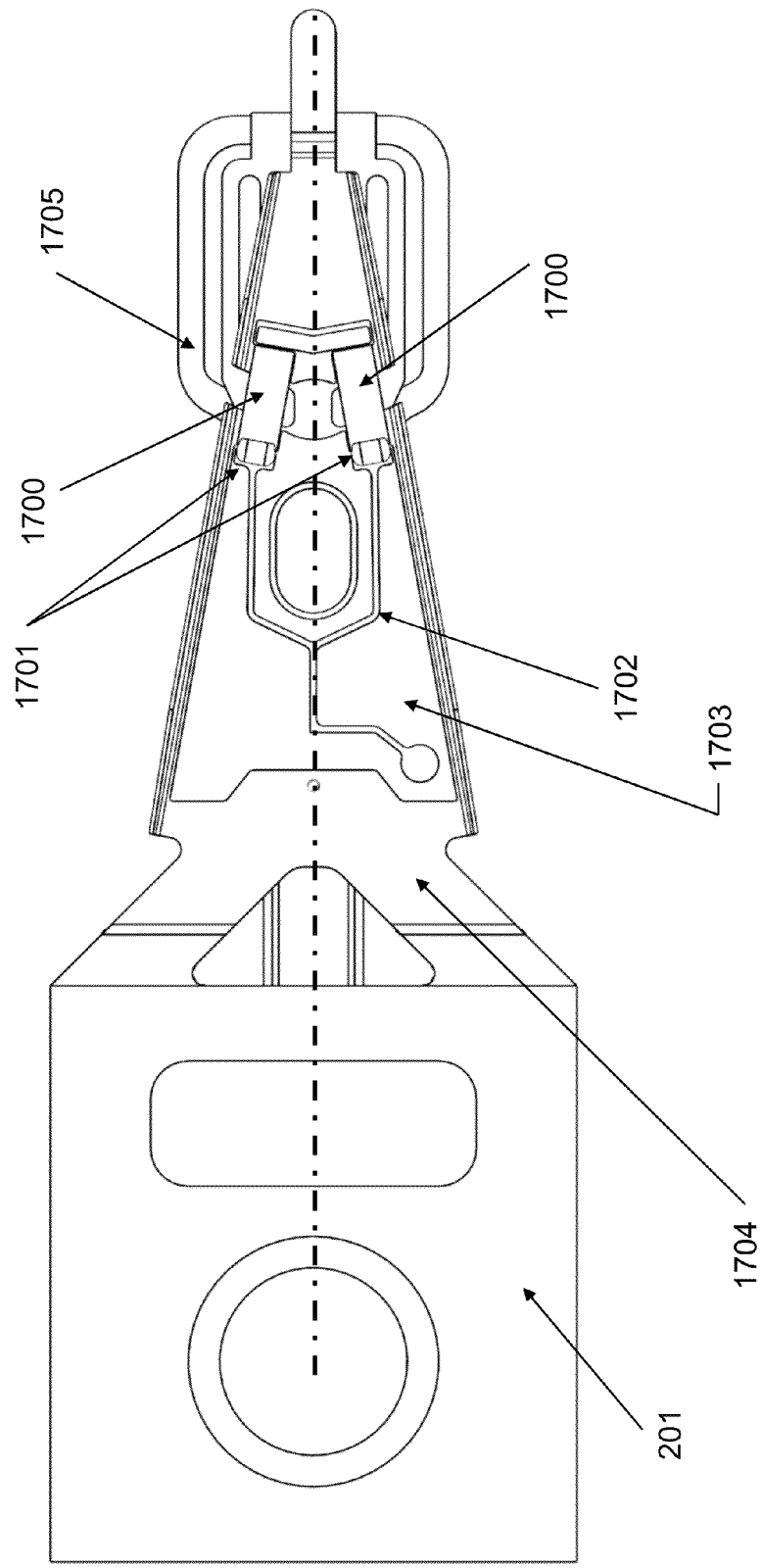

FIG. 17 illustrates an extended circuit integrated suspension (ECIS) for connection to PZTs acting as Semi Collocated Micro-Actuators (SCLMA), in accordance with an application of the example implementations. The example application shown in FIG. 17 brings electrical traces to the top of the load beam 1704, which may be connected to PZTs 1700 disposed on the load beam and connected to the load beam circuit by solder jet bonds (SJB) 1701. The PZTs are semi collocated in proximity to each other. The traces forming the load beam circuit 1702 may utilize a conductive layer (e.g. such as copper) that has a hole in the pads to connect to the flexure circuit 1705, with a load beam circuit polyimide 1703 to separate the circuit from the load beam. A conventional baseplate gimbal 201 may be used in such a configuration, or customized depending on the desired implementation. Further, the traces for connecting to the PZTs are not limited to this configuration. Other configurations are also possible for connecting to the PZTs (e.g. straight traces to PZTs).

Figure 18:
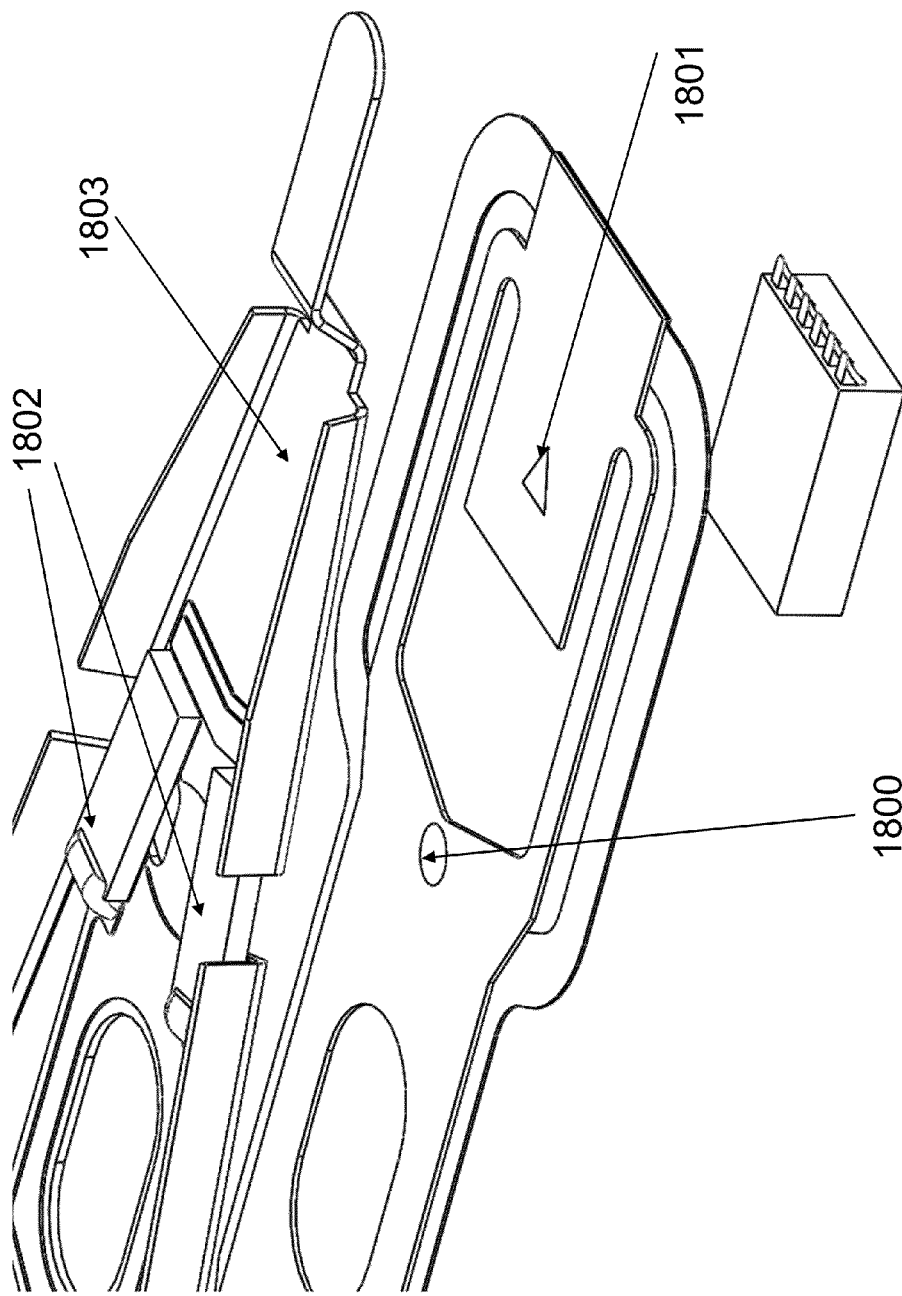
FIG. 18 illustrates an ECIS with a center gimbal weld and dimple, in accordance with an application of the example implementations.

FIG. 18 illustrates an ECIS with a center gimbal weld 1800 and dimple 1801, in accordance with an application of the example implementations. As shown in the example of FIG. 18, the PZTs 1802 and the slotted load beam 1803 surround, and are longitudinally centered with, the gimbal dimple 1800, which behaves as a pivot point for the micro-actuator. The center-type gimbal weld 1800 can be used for the SCLMA.

Figure 19:
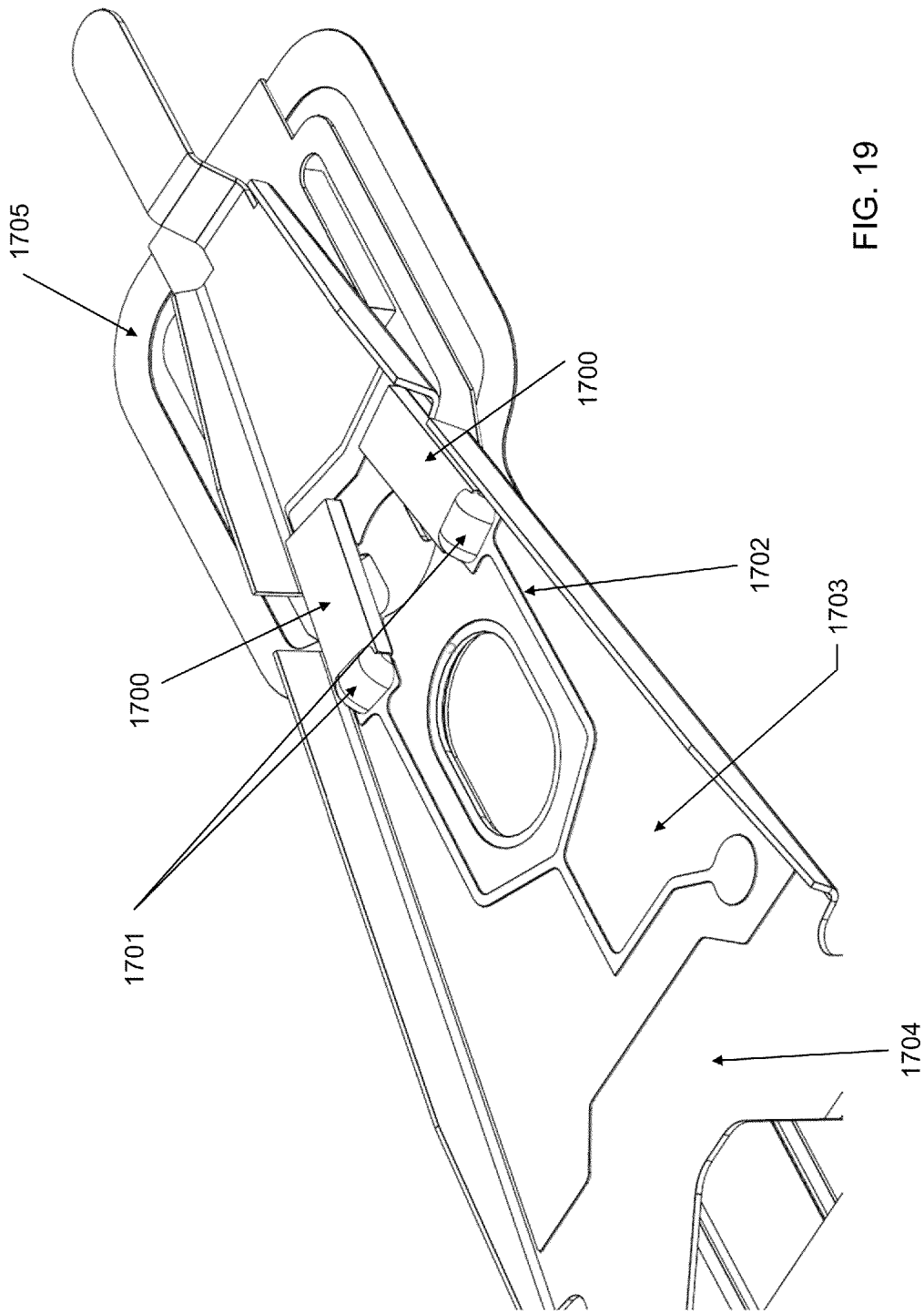

FIG. 19 illustrates a close-up of the PZT motors of FIG. 17, in accordance with an exemplary embodiment. In an example application, a conventional gimbal may be used with the load beam 1704, thereby removing the necessity of having added traces or copper contribution through the gimbal. The PZTs in the configuration of FIG. 19 may also have more lateral space and height as a result of placing them on the load beam. With the collocation of the PZTs on the load beam, there may be reduced excitation at the load beam and at the electronic circuit block (E-block) arm in comparison to the related art configuration.

Various layers may also be employed around the PZT in an example application. For example, each PZT may be connected to a top PZT electrode and a bottom PZT electrode that is attached to a stainless steel (SST) support layer of the load beam by a conductive epoxy. The top PZT electrode may be connected to the copper layer of the traces by a solder jet bond (SJB) The traces may include a cover layer, a conductive layer (e.g. such as copper) and a base layer.

Further, the SCLMA configuration as described above may also be used in a "sense" mode, in accordance with an example application. For example, the PZT's would generate a voltage, so an off-track shock and/or vibration event can be detected locally at the head. In comparison, related art shock sensors are located on the Main Drive PCB, the Flexible Printed Circuit (FPC) connector, or a circuit residing on the E-block arm.

Moreover, other implementations will be apparent to those skilled in the art from consideration of the specification and practice of the example implementations disclosed herein. Various aspects and/or components of the described implementations may be used alone or in any combination in the ECIS. It is intended that the specification and examples be considered as examples only, with a true scope and spirit of the invention being indicated by the following claims.

What is claimed is:

1. An Extended Circuit Integrated Suspension (ECIS), comprising:
   a load beam;
   a flexure circuit comprising a plurality of traces; and
   a connection portion which connects the load beam laterally to the flexure circuit,
   wherein the load beam, the flexure circuit, and the connecting portion are a single component from a single panel,
   the connection portion has a folded orientation configured to place the flexure circuit onto a first side of the load beam, and
   at least one of the plurality of traces is connected to circuitry disposed on an opposite side of said first side of the load beam.

2. The ECIS of claim 1, wherein the connection portion comprises a stainless steel connector.

3. The ECIS of claim 1, wherein the connection portion comprises at least one of the plurality of traces connected to the circuitry.

* * * * *